US012143496B1

United States Patent
Nelson et al.

(10) Patent No.: US 12,143,496 B1
(45) Date of Patent: Nov. 12, 2024

(54) BLOCK VALIDATION USING AUTHENTICATED INDEX DATA STRUCTURE

(71) Applicant: Blockstack PBC, New York, NY (US)

(72) Inventors: Jude Nelson, New Brunswick, NJ (US); Aaron Blankstein, Chicago, IL (US)

(73) Assignee: Hiro Systems PBC, New York, NY (US)

( * ) Notice: Subject to any disclaimer, the term of this patent is extended or adjusted under 35 U.S.C. 154(b) by 230 days.

(21) Appl. No.: 17/105,297

(22) Filed: Nov. 25, 2020

Related U.S. Application Data

(60) Provisional application No. 62/946,229, filed on Dec. 10, 2019.

(51) Int. Cl.
*H04L 9/00* (2022.01)
*H04L 9/32* (2006.01)

(52) U.S. Cl.
CPC .......... *H04L 9/3236* (2013.01); *H04L 9/3263* (2013.01); *H04L 9/3297* (2013.01); *H04L 9/50* (2022.05)

(58) Field of Classification Search
CPC ... H04L 9/3236; H04L 9/3263; H04L 9/3297; H04L 9/50
See application file for complete search history.

(56) References Cited

U.S. PATENT DOCUMENTS

| 7,620,640 | B2 | 11/2009 | Sample |
| 9,578,120 | B1 * | 2/2017 | Evenson ................. H04L 67/55 |
| 11,528,146 | B1 | 12/2022 | Nelson et al. |
| 2016/0027229 | A1 | 1/2016 | Spanos et al. |
| 2017/0236123 | A1 | 8/2017 | Ali et al. |
| 2019/0123892 | A1 | 4/2019 | Basu |
| 2019/0238525 | A1 | 8/2019 | Padmanabhan |
| 2019/0268138 | A1 | 8/2019 | Mankovskii et al. |
| 2019/0279247 | A1 | 9/2019 | Finken et al. |
| 2019/0306190 | A1 | 10/2019 | Suraparaju |
| 2020/0067713 | A1 | 2/2020 | Struttmann et al. |
| 2020/0167345 | A1 * | 5/2020 | Zhuo ................... G06Q 20/388 |
| 2020/0304505 | A1 | 9/2020 | Shen et al. |

(Continued)

FOREIGN PATENT DOCUMENTS

CN 106777351 5/2017

OTHER PUBLICATIONS

"Kevin Lee, Authenticated Data Structures for Privacy-Preserving Monero Light Clients, 2018, IEEE, pp. 20-28" (Year: 2018).*

(Continued)

*Primary Examiner* — Kevin Ayala
(74) *Attorney, Agent, or Firm* — Knobbe, Martens Olson & Bear, LLP

(57) ABSTRACT

Various systems and methods use a Merklized Adaptive Radix Forest (MARF), which is an authenticated index data structure that can be used by peers, clients, miners, and/or other participants in a blockchain network for efficiently encoding a cryptographic commitment to a blockchain state. For example, the MARF data structure can be used to represent a blockchain state as key-value pairs within an authenticated directory. The MARF data structure may include various merklized adaptive radix tries (ARTs) associated with different blocks in the blockchain, some of which may be linked together via one or more back-pointers.

20 Claims, 16 Drawing Sheets

(56) References Cited

U.S. PATENT DOCUMENTS

| | | |
|---|---|---|
| 2020/0313956 A1 | 10/2020 | Heitz et al. |
| 2020/0320055 A1 | 10/2020 | Zhang |
| 2021/0109917 A1 | 4/2021 | Xiao et al. |
| 2021/0135854 A1 | 5/2021 | Karame et al. |
| 2022/0216997 A1* | 7/2022 | Davies .................. H04L 9/3239 |

OTHER PUBLICATIONS

Viktor Leis, The Adaptive Radix Tree: ARTful Indexing for Main-Memory Databases, 2013, IEEE, pp. 38-49 (Year: 2013).*

"Pandian Raju, mLSM: Making Authenticated Storage Faster in Ethereum, 2018, In 10th USenix Workshop on Hot Topics in Storage and File Systems, pp. 1-6" (Year: 2018).*

Ali, Muneeb, Dissertation, Trust-to-Trust Design of a New Internet, dated Jun. 2017.

Ali, Muneeb et al., Blockstack: A New Decentralized Internet, dated May 2017.

Ali, Muneeb et al., Blockstack: A New Internet for Decentralized Applications, dated Oct. 2017.

Ali, Muneeb et al., Blockstack: A Global Naming and Storage System Secured by Blockchains. In Proceedings of the 2016 USENIX Annual Technical Conference, Jun. 2016.

Ali, Muneeb et al., Bootstrapping Trust in Distributed Systems with Blockchains. In USENIX ;login 41(3):52-58, Fall 2016.

Ali, Muneeb et al., The Blockstack Decentralized Computing Network, dated May 30, 2019.

Nelson, Jude et al., Extending Existing Blockchains with Virtualchain. In Workshop on Distributed Cryptocurrencies and Consensus Ledgers, 2016.

Nelson, Jude, Dissertation: Wide-Area Software-Defined Storage, dated Jun. 2018.

Nelson, "SIP 004 Cryptographic Commitment to Materialized Views," https://github.com/stacks- network/stacks-blockchain/blob/feature/sip-004/sip/sip-004-materialized-view.md, dated Aug. 8, 2019.

Nelson, "SIP 004 Cryptographic Commitment to Materialized Views," https://github.com/stacks- network/stacks-blockchain/blob/46aa9ef024d320de66f1006a0712cb514e463c09/sip/sip-004- materialized-view.md, dated Jul. 15, 2019.

* cited by examiner

| Block | Fork ID | Index | Parent Fork ID | Parent Index |
|---|---|---|---|---|
| a | 0 | 0 | 0 | 0 |
| b | 0 | 1 | 0 | 0 |
| c | 0 | 2 | 0 | 1 |
| d | 0 | 3 | 0 | 2 |
| e | 0 | 4 | 0 | 3 |
| f | 0 | 5 | 0 | 4 |
| g | 0 | 6 | 1 | 5 |
| h | 1 | 0 | 1 | 2 |
| i | 1 | 1 | 0 | 0 |
| j | 2 | 0 | 2 | 1 |
| k | 2 | 1 | 2 | 0 |
| l | 2 | 2 | | 1 |

BLOCK VALIDATION USING AUTHENTICATED INDEX DATA STRUCTURE

CROSS-REFERENCE TO RELATED APPLICATIONS

This application claims priority under 35 U.S.C. § 119(e) to U.S. Provisional Patent Application No. 62/946,229, entitled "CRYPTOGRAPHIC COMMITMENT TO MATERIALIZED VIEWS" and filed on Dec. 10, 2019, the entire disclosure of which is hereby incorporated by reference herein. This application is also being filed on Nov. 25, 2020, the same date as U.S. patent application Ser. No. 17/105,207 and U.S. patent application Ser. No. 17/105,299, which are hereby incorporated by reference herein in their entireties. Any and all applications, if any, for which a foreign or domestic priority claim is identified in the Application Data Sheet of the present application are hereby incorporated by reference in their entireties under 37 CFR 1.57.

FIELD OF THE DISCLOSURE

The described technology generally relates to computer systems, devices, and methods for distributed ledger and blockchain systems, and in particular, to computer systems, devices, and methods for implementing a specific data structure that efficiently encodes the materialized views of a distributed ledger or blockchain for validating purposes.

BACKGROUND

A blockchain is a distributed ledger that can be used to record transactions and reduce the likelihood that recorded transactions are altered retroactively. Generally, a blockchain can be implemented within a peer-to-peer network. Computing devices participating in the peer-to-peer network (e.g., peers, clients, miners, etc.) can each include a copy of the blockchain and broadcast transactions to other computing devices participating in the peer-to-peer network.

The blockchain itself can include a chain of blocks that are linked together cryptographically, with each block in the chain storing one or more transactions and the number of blocks in the chain growing over time. For example, a transaction can include a cryptocurrency payment, execution of a smart contract, submission of an online vote, and/or any other type of exchange or event. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

SUMMARY OF THE DISCLOSURE

Described herein are systems and methods for using a Merklized Adaptive Radix Forest (MARF), an authenticated index data structure, for efficiently encoding a cryptographic commitment to blockchain state by the peers of a blockchain network.

Various aspects of the novel systems and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

One aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: detect an addition of a first block in a fork of a blockchain via the decentralized network, where the first block stores a plurality of transactions, and where the fork comprises a prior block; generate an adaptive radix trie (ART) for the first block, where the ART comprises a root node; determine that a first transaction in the plurality of transactions corresponds to a first key and a first value; determine a path based on a hash of the first key; determine that the path shares a prefix with a second path corresponding to a second node in a second ART for the prior block; and modify the ART for the first block to include a child of the root node that is a back-pointer that references the second node in the second ART for the prior block.

The computing device of the preceding paragraph can include any sub-combination of the following features: where the program instructions, when executed, further cause the computing device to: copy the second node, and replace the back-pointer with the copy of the second node such that the copy of the second node is a child node of the root node; where a third node is a child of the second node in the second ART, and where the program instructions, when executed, further cause the computing device to modify the modified ART to include a child of the copy of the second node that is a second back-pointer to the third node; where the program instructions, when executed, further cause the computing device to: determine that a portion of the path and a portion of a third path corresponding to the third node match, copy the third node, and replace the second back-pointer with the copy of the third node such that the copy of the third node is a child node of the copy of the second node; where a fourth node is a child of the third node in the second ART, and where the program instructions, when executed, further cause the computing device to modify the second modified ART to include a child of the copy of the third node that is a third back-pointer to the fourth node; where the program instructions, when executed, further cause the computing device to modify the modified ART to include a child of the copy of the second node that is a leaf node representing the first transaction; where the program instructions, when executed, further cause the computing device to: determine a value hash based on a hash of the first value, and store the value hash in the leaf node; where the program instructions, when executed, further cause the computing device to: determine that a second transaction in the plurality of transactions corresponds to a second key and a second value, determine a third path based on a hash of the second key, determine that the third path shares a prefix with the second path corresponding to the copy of the second node and a fourth path corresponding to a third node in a third ART for a third block in the fork, and modify the modified ART for the first block to include a child of the copy of the second node that is a second back-pointer that references the third node in the third ART for the third block; and where the computing device is a peer device in the decentralized network.

Another aspect of the disclosure provides a computer-implemented method comprising: under control of a computing device in a decentralized network, detecting an addition of a first block in a fork of a blockchain via the decentralized network, where the first block stores a plurality of transactions, and where the fork comprises a prior block; generating an adaptive radix trie (ART) for the first block, where the ART comprises a root node; determining that a first transaction in the plurality of transactions corresponds to a first key and a first value; determining a path based on a hash of the first key; determining that the path shares a prefix with a second path corresponding to a second node in a second ART for the prior block; and modifying the ART for the first block to include a child of the root node that is a back-pointer that references the second node in the second ART for the prior block.

The computer-implemented method of the preceding paragraph can include any sub-combination of the following features: where the computer-implemented method further comprises copying the second node, and replacing the back-pointer with the copy of the second node such that the copy of the second node is a child node of the root node; where a third node is a child of the second node in the second ART, and where the computer-implemented method further comprises modifying the modified ART to include a child of the copy of the second node that is a second back-pointer to the third node; where the computer-implemented method further comprises: determining that a portion of the path and a portion of a third path corresponding to the third node match, copying the third node, and replacing the second back-pointer with the copy of the third node such that the copy of the third node is a child node of the copy of the second node; where a fourth node is a child of the third node in the second ART, and where the computer-implemented method further comprises modifying the second modified ART to include a child of the copy of the third node that is a third back-pointer to the fourth node; where the computer-implemented method further comprises modifying the modified ART to include a child of the copy of the second node that is a leaf node representing the first transaction; and where the computer-implemented method further comprises determining a value hash based on a hash of the first value, and storing the value hash in the leaf node.

Another aspect of the disclosure provides non-transitory, computer-readable storage media comprising computer-executable instructions for using back-pointers to form a materialized view of a fork in a blockchain, where the computer-executable instructions, when executed by a computer system in a decentralized network, cause the computer system to: detect an addition of a first block in the fork of the blockchain via the decentralized network, where the first block stores a plurality of transactions, and where the fork comprises a prior block; generate an adaptive radix trie (ART) for the first block, where the ART comprises a root node; determine that a first transaction in the plurality of transactions corresponds to a first key and a first value; determine a path based on a hash of the first key; determine that the path shares a prefix with a second path corresponding to a second node in a second ART for the prior block; and modify the ART for the first block to include a child of the root node that is a back-pointer that references the second node in the second ART for the prior block.

The non-transitory, computer-readable storage media of the preceding paragraph can include any sub-combination of the following features: where the computer-executable instructions further cause the computer system to: copy the second node, and replace the back-pointer with the copy of the second node such that the copy of the second node is a child node of the root node; where a third node is a child of the second node in the second ART, and where the computer-executable instructions further cause the computer system to modify the modified ART to include a child of the copy of the second node that is a second back-pointer to the third node; and where the computer-executable instructions further cause the computer system to: determine that a portion of the path and a portion of a third path corresponding to the third node match, copy the third node, and replace the second back-pointer with the copy of the third node such that the copy of the third node is a child node of the copy of the second node.

Another aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: detect an addition of a first block in a fork of a blockchain via the decentralized network, where the first block stores a plurality of transactions, and where the fork comprises a prior block; generate an adaptive radix trie (ART) root hash for the first block based on the plurality of transactions and an ART root hash of the prior block; store the ART root hash for the first block in a fork table in a row associated with the fork; and store, in an ancestor table, an indication of a row in the fork table in which the ART root hash is stored, where the computing device is configured to use the ancestor table and the fork table to provide a proof to a second computing device such that the second computing device can verify the accuracy of data received from the blockchain.

The computing device of the preceding paragraph can include any sub-combination of the following features: where the first block is a first number of blocks before a current block of the fork, and where the program instructions, when executed, further cause the computing device to: determine to obtain an ART root hash of a block that is the first number of blocks before the current block, determine an identification of the fork in which the current block resides based on the ancestor table, determine a list of blocks that reside in the identified fork based on the fork table, determine that the first block is the first number of blocks before the current block in the identified fork based on the list of blocks, and retrieve the ART root hash of the first block from the fork table; where the program instructions, when executed, further cause the computing device to determine to obtain the ART root hash of the first block in response to reception of a request from the second computing device to provide the proof; where the first block is a first number of blocks before a current block, where the current block is in a different fork than the first block, and where the program instructions, when executed, further cause the computing device to: determine to obtain an ART root hash of a block that is the first number of blocks before the current block, determine an identification of a second fork in which the current block resides based on the ancestor table, determine a list of blocks that reside in the identified second fork based on the fork table, determine that a number of blocks in the list of blocks is less than the first number, determine a parent block of a block listed first in the list of blocks, determine an identification of the fork in which the parent block resides based on the ancestor table, determine a second list of blocks that reside in the fork based on the fork table, determine that the first block is the first number of blocks before the current block based on the second list of blocks, and retrieve the ART root hash of the first block from the fork table; where the program instructions, when executed, further cause the computing device to store the ART root hash for the first block in the fork table in the row associated with the fork at a first offset; where the program instructions, when executed, further cause the computing device to store, in the ancestor table, an indication of that the ART root hash is stored at the first offset; where the program instructions, when executed, further cause the computing device to store, in the ancestor table, an indication of a second row in the fork table in which a second ART root hash of a parent block of the first block is stored; and where the program instructions, when executed, further cause the computing device to: add a first leaf node to an ART of the first block that at least partially encodes a first key-value pair in which a key of the first key-value pair is the ART root hash for the first block and a value of the first key-value pair is a block height of the first block in the fork, and add a second leaf node to the ART of the first block that at least partially encodes a second key-value pair in which a key of the second key-value pair is the block height of the first block in the fork and a value of the second key-value pair is the ART root hash for the first block.

Another aspect of the disclosure provides a computer-implemented method comprising: under control of a computing device in a decentralized network, detecting an addition of a first block in a fork of a blockchain via the decentralized network, where the first block stores a plurality of transactions, and where the fork comprises a prior block; generating an adaptive radix trie (ART) root hash for the first block based on the plurality of transactions and an ART root hash of the prior block; storing the ART root hash for the first block in a fork table in a row associated with the fork; and storing, in an ancestor table, an indication of a row in the fork table in which the ART root hash is stored, where the computing device is configured to use the ancestor table and the fork table to provide a proof to a second computing device such that the second computing device can verify the accuracy of data received from the blockchain.

The computer-implemented method of the preceding paragraph can include any sub-combination of the following features: where the first block is a first number of blocks before a current block of the fork, and where the computer-implemented method further comprises: determining to obtain an ART root hash of a block that is the first number of blocks before the current block, determining an identification of the fork in which the current block resides based on the ancestor table, determining a list of blocks that reside in the identified fork based on the fork table, determining that the first block is the first number of blocks before the current block in the identified fork based on the list of blocks, and retrieving the ART root hash of the first block from the fork table; where determining to obtain an ART root hash of a block that is the first number of blocks before the current block further comprises determining to obtain the ART root hash of the first block in response to reception of a request from the second computing device to provide the proof; where the first block is a first number of blocks before a current block, where the current block is in a different fork than the first block, and where the computer-implemented method further comprises: determining to obtain an ART root hash of a block that is the first number of blocks before the current block, determining an identification of a second fork in which the current block resides based on the ancestor table, determining a list of blocks that reside in the identified second fork based on the fork table, determining that a number of blocks in the list of blocks is less than the first number, determining a parent block of a block listed first in the list of blocks, determining an identification of the fork in which the parent block resides based on the ancestor table, determining a second list of blocks that reside in the fork based on the fork table, determining that the first block is the first number of blocks before the current block based on the second list of blocks, and retrieving the ART root hash of the first block from the fork table; where the computer-implemented method further comprises storing the ART root hash for the first block in the fork table in the row associated with the fork at a first offset; where the computer-implemented method further comprises storing, in the ancestor table, an indication of that the ART root hash is stored at the first offset; and where the computer-implemented method further comprises: adding a first leaf node to an ART of the first block that at least partially encodes a first key-value pair in which a key of the first key-value pair is the ART root hash for the first block and a value of the first key-value pair is a block height of the first block in the fork, and adding a second leaf node to the ART of the first block that at least partially encodes a second key-value pair in which a key of the second key-value pair is the block height of the first block in the fork and a value of the second key-value pair is the ART root hash for the first block.

Another aspect of the disclosure provides non-transitory, computer-readable storage media comprising computer-executable instructions for using a fork table in a blockchain, where the computer-executable instructions, when executed by a computer system in a decentralized network, cause the computer system to: detect an addition of a first block in a fork of a blockchain via the decentralized network, where the first block stores a plurality of transactions, and where the fork comprises a prior block; generate an adaptive radix trie (ART) root hash for the first block based on the plurality of transactions and an ART root hash of the prior block; store the ART root hash for the first block in the fork table in a row associated with the fork; and store, in an ancestor table, an indication of a row in the fork table in which the ART root hash is stored, where the computing device is configured to use the ancestor table and the fork table to provide a proof to a second computing device such that the second computing device can verify the accuracy of data received from the blockchain.

The non-transitory, computer-readable storage media of the preceding paragraph can include any sub-combination of the following features: where the first block is a first number of blocks before a current block of the fork, and where the computer-executable instructions further cause the computer system to: determine to obtain an ART root hash of a block that is the first number of blocks before the current block, determine an identification of the fork in which the current block resides based on the ancestor table, determine a list of blocks that reside in the identified fork based on the fork table, determine that the first block is the first number of blocks before the current block in the identified fork based on the list of blocks, and retrieve the ART root hash of the first block from the fork table; where the computer-executable instructions further cause the computer system to obtain the ART root hash of the first block in response to reception of a request from the second computing device to provide the proof; where the first block is a first number of blocks before a current block, where the current block is in a different fork than the first block, and where the computer-executable instructions further cause the computer system to: determine to obtain an ART root hash of a block that is the first number of blocks before the current block, determine an identification of a second fork in which the current block resides based on the ancestor table, determine a list of blocks that reside in the identified second fork based on the fork table, determine that a number of blocks in the list of blocks is less than the first number, determine a parent block of a block listed first in the list of blocks, determine an identification of the fork in which the parent block resides based on the ancestor table, determine a second list of blocks that reside in the fork based on the fork table, determine that the first block is the first number of blocks before the current block based on the second list of blocks, and retrieve the ART root hash of the first block from the fork table; and where the computer-executable instructions further cause the computer system to: add a first leaf node to an ART of the first block that at least partially encodes a first key-value pair in which a key of the first key-value pair is the ART root hash for the first block and a value of the first key-value pair is a block height of the first block in the fork, and add a second leaf node to the ART of the first block that at least partially encodes a second key-value pair in which a key of the second key-value pair is the block height of the first block in the fork and a value of the second key-value pair is the ART root hash for the first block.

Another aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: transmit a request for a value associated with a key, where a hash of the value is stored in a first adaptive radix trie (ART) associated with a first block in a fork in a blockchain, and where the first block is an ancestor of a current block in the fork in the blockchain; transmit a second request for a proof that the hash of the value received in response to transmission of the request is valid; determine an ART root hash of the first block using a head shunt proof and a first segment proof received in response to transmission of the second request; determine a second ART root hash of the current block using a second shunt proof received in response to transmission of the second request, a second segment proof received in response to transmission of the second request, and the determined ART root hash of the first block; compare the determined second ART root hash of the current block to a third ART root hash provided by a second computing device; and validate that a second ART associated with the current block represents an accurate digest of a materialized view of the fork in response to a determination that the determined second ART root hash matches the third ART root hash.

The computing device of the preceding paragraph can include any sub-combination of the following features: where the third ART root hash is an ART root hash of the current block as indicated by the second computing device; where the second ART associated with the current block comprises a back-pointer to the ART associated with the first block; where the head shunt proof comprises an indication of an ART root hash of at least one ancestor of the first block; where the first segment proof comprises an indication of a hash of at least one node in the ART associated with the first block; where the program instructions, when executed, further cause the computing device to: generate a hash of the hash of the value and the hash of the at least one node in the ART associated with the first block to determine a hash of children of a root node of the ART associated with the first block, and generate a hash of the hash of the children of the root node of the ART associated with the first block and the ART root hash of the at least one ancestor of the first block to determine the ART root hash of the first block; where the second shunt proof comprises an indication of an ART root hash of at least one ancestor of the current block; where the second segment proof comprises an indication of a hash of at least one node in second ART associated with the current block; where the second ART associated with the current block comprises a back-pointer to the ART associated with the first block, and where the program instructions, when executed, further cause the computing device to: generate a hash of the ART root hash of the first block and the hash of the at least one node in the second ART associated with the current block to determine a hash of children of a root node of the second ART associated with the current block, and generate a hash of the hash of the children of the root node of the second ART associated with the current block and the ART root hash of the at least one ancestor of the current block to determine the second ART root hash of the current block; where the program instructions, when executed, further cause the computing device to validate that the hash of the value is accurate in response to a determination that the determined second ART root hash matches the third ART root hash; and where the program instructions, when executed, further cause the computing device to determine that a peer computing device in the decentralized network that provided the hash of the value is a trusted entity in response to a determination that the determined second ART root hash matches the third ART root hash.

Another aspect of the disclosure provides a computer-implemented method comprising: under control of a computing device in a decentralized network, transmitting a request for a value associated with a key, where a hash of the value is stored in a first adaptive radix trie (ART) associated with a first block in a fork in a blockchain, and where the first block is an ancestor of a current block in the fork in the blockchain; transmitting a second request for a proof that the hash of the value received in response to transmission of the request is valid; determining an ART root hash of the first block using a head shunt proof and a first segment proof received in response to transmission of the second request; determining a second ART root hash of the current block using a second shunt proof received in response to transmission of the second request, a second segment proof received in response to transmission of the second request, and the determined ART root hash of the first block; comparing the determined second ART root hash of the current block to a third ART root hash provided by a second computing device; and validating that a second ART associated with the current block represents an accurate digest of a materialized view of the fork in response to a determination that the determined second ART root hash matches the third ART root hash.

The computer-implemented method of the preceding paragraph can include any sub-combination of the following features: where the third ART root hash is an ART root hash of the current block as indicated by the second computing device; where the second ART associated with the current block comprises a back-pointer to the ART associated with the first block; where the head shunt proof comprises an indication of an ART root hash of at least one ancestor of the first block; where the first segment proof comprises an indication of a hash of at least one node in the ART associated with the first block; and where determining an ART root hash of the first block further comprises: generating a hash of the hash of the value and the hash of the at least one node in the ART associated with the first block to determine a hash of children of a root node of the ART associated with the first block, and generating a hash of the hash of the children of the root node of the ART associated with the first block and the ART root hash of the at least one ancestor of the first block to determine the ART root hash of the first block.

Another aspect of the disclosure provides non-transitory, computer-readable storage media comprising computer-executable instructions for validating data obtained from a blockchain, where the computer-executable instructions, when executed by a computer system in a decentralized network, cause the computer system to: transmit a request for a value associated with a key, where a hash of the value is stored in a first adaptive radix trie (ART) associated with a first block in a fork in a blockchain, and where the first block is an ancestor of a current block in the fork in the blockchain; transmit a second request for a proof that the hash of the value received in response to transmission of the request is valid; determine an ART root hash of the first block using a head shunt proof and a first segment proof received in response to transmission of the second request; determine a second ART root hash of the current block using a second shunt proof received in response to transmission of the second request, a second segment proof received in response to transmission of the second request, and the determined ART root hash of the first block; compare the determined second ART root hash of the current block to a third ART root hash provided by a second computing device; and validate that a second ART associated with the current block represents an accurate digest of a materialized view of the fork in response to a determination that the determined second ART root hash matches the third ART root hash.

The non-transitory, computer-readable storage media of the preceding paragraph can include any sub-combination of the following features: where the computer-executable instructions further cause the computer system to validate that the hash of the value is accurate in response to a determination that the determined second ART root hash matches the third ART root hash; and where the computer-executable instructions further cause the computer system to determine that a peer computing device in the decentralized network that provided the hash of the value is a trusted entity in response to a determination that the determined second ART root hash matches the third ART root hash.

BRIEF DESCRIPTION OF THE DRAWINGS

The following drawings and the associated description herein are provided to illustrate specific embodiments of the disclosure and are not intended to be limiting.

FIG. 5B illustrates an example ancestor table that corresponds to the blockchain state and fork table of FIG. 5A.

DETAILED DESCRIPTION

Figure 1A:
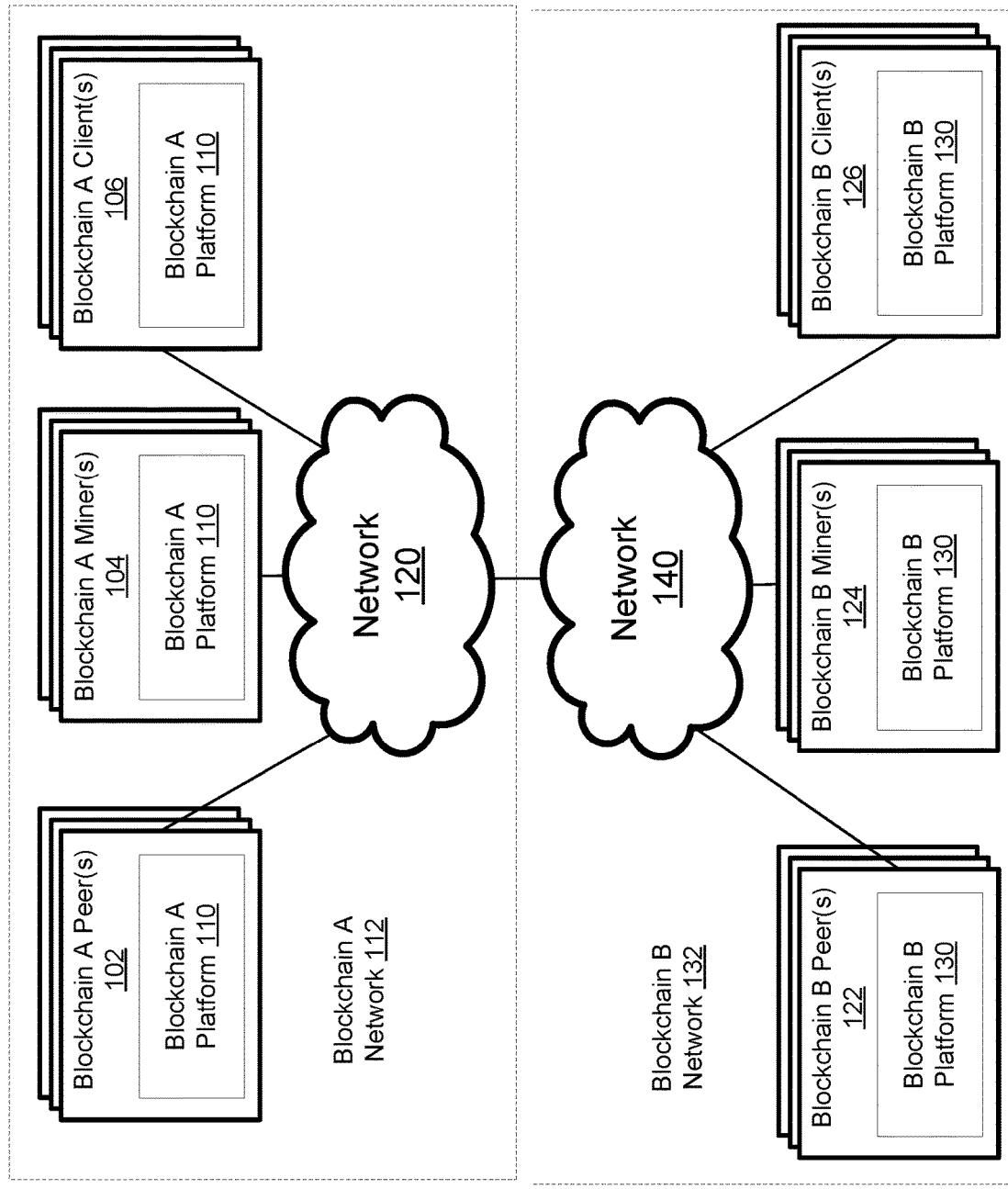
FIG. 1A is a system diagram that illustrates the components of a blockchain system.

Blockchain technology allows for data redundancy and fault tolerance across a blockchain network by having all the peers (e.g., virtual or physical computing devices that store an incomplete or complete copy of the blockchain and that can verify some or all transactions that have occurred since the genesis of the blockchain, also referred to herein as "nodes") serve as replicated state machines. As described herein, some or all of the peers can maintains a materialized view of the current state of the blockchain that is represented by a transaction log, which the peer can reference in order to validate a subsequent transaction for inclusion in the transaction log-usually through a blockchain mining process.

In some blockchain implementations, the blockchain may fork at a particular block into one or more chains. For example, a block in one chain and a block in another chain may each be linked cryptographically to a common parent block. The blockchain can include any number of forks (e.g., any number of chains that share a common ancestor block). As described herein, the blockchain peers may maintain a materialized view of the state of one or more forks in the blockchain. The state of a fork may include an indication of key-value pairs stored in one or more blocks in the fork. By maintaining a materialized view of the state of one or more forks in the blockchain, a peer can prove to a client (e.g., a physical or virtual computing device that submits a transaction to a blockchain network, such as a physical or virtual computing device operated by a user of an application, a physical or virtual computing device or server operated by an entity that provides or operates an application, etc.) that a particular key has a particular value and was last updated in a transaction stored in a particular block in the fork. As a result, the client does not have to rely on an assumption that a peer is acting as an honest actor in the blockchain network. Rather, the client can determine how difficult it would be for the peer to generate a dishonest key-value pair, such as by determining the number of blocks that would have to be maliciously generated and accepted by the blockchain network to produce the dishonest key-value pair. Thus, as described in greater detail below, the client can use additional factors to verify whether a peer is trustworthy or acting as a malicious actor, thereby providing clients with extra protection against peers that may be acting dishonestly and improving the security of the blockchain network.

As part of the mining process, a miner (e.g., a physical or virtual computing device that forms new blocks in a blockchain, where some devices may also store an incomplete or complete copy of the blockchain and/or obtain information about the blockchain from other peers or nodes and/or miners) may cryptographically commit to this materialized view of the state of some or all of the forks in order to mine a block in the blockchain. For example, a miner may broadcast a cryptographic hash of an authenticated index data structure in the block generated by the miner, which demonstrates to the peers, clients, other miners, and/or other participants in the blockchain network that the miner has applied the block's transactions to the fork state accurately. This can provide better security and allow participants in the blockchain network to detect malfunctioning miners early on, since a malfunctioning miner will generally calculate a different, incorrect materialized view of the state of the fork using the same block transactions as non-malfunctioning peers and/or will generally calculate a different, incorrect state view hash than non-malfunctioning peers. By quickly detecting a malfunctioning miner based on an incorrect materialized view and/or state view hash calculated by the miner, peers can quickly reject a block produced by the malfunctioning miner without having to replay the transactions of the block prior to rejection. Thus, there is less risk that additional blocks will be cryptographically linked to an invalid block generated by a malfunctioning miner.

However, committing to the materialized view in each block has a non-zero cost in terms of time and computing resource usage. As a result, miners that have more computing resources available may be able to generate the materialized view faster than those miners that have fewer computing resources available. Thus, committing to the materialized view can affect which miner is selected to generate a new block in the blockchain and can increase a time taken to generate a new block in the blockchain given the materialized view calculation costs. To reduce the effects that calculating a materialized view has on selecting a miner for a new block in the blockchain and to reduce a time taken to generate a new block in the blockchain, it may be desirable to develop a computationally-efficient process for encoding a cryptographic commitment to a blockchain state that results in fast materialized view calculations and/or fast block validations that use fewer computing resources.

Accordingly, the present disclosure illustrates various systems and methods for using a Merklized Adaptive Radix Forest (MARF), which is an authenticated index data structure that can be used by peers, clients, miners, and/or other participants in a blockchain network for efficiently encoding a cryptographic commitment to a blockchain state.

In some embodiments, the MARF data structure can be used to represent a blockchain state as key-value pairs within an authenticated directory. The materialized view stored by each peer can be realized as a flat data store of key-value pairs, and transactions stored in blocks in the blockchain may include zero or more create, insert, update, and/or delete transactions on this data store of key-value pairs. In some embodiments, data may not be removed from the data store of key-value pairs. Rather, a peer may encode a delete transaction corresponding to a particular key (e.g., a transaction indicating that a particular key should be deleted) by replacing the value of the key with a tombstone record. The materialized view of a state of a fork may be the subset of key-value pairs in the data store that belong to the particular fork in the blockchain.

In some embodiments, the MARF data structure gives each peer in the blockchain network the ability to prove to a client (given the MARF's cryptographic hash): (1) what the value of a particular key is; (2) how much cumulative energy has been spent to produce the key-value pair; and/or (3) how many confirmations the key-value pair has. This proof may have $O(\log^2 B)$ space for B blocks, and can take $O(\log^2 B)$ time complexity to produce and verify. In addition, the proof may offer $O(1)$ expected time and space complexity for inserts and queries.

In some embodiments, the MARF data structure may comprise one or more data structures: (1) a merklized adaptive radix trie for each block in the blockchain; (2) a fork table that keeps track of the chain tips and parent/child relationships between blocks in the blockchain; and/or (3) a merklized skip-list that cryptographically links merklized adaptive radix tries in prior blocks to the current block. These components of the MARF data structure and their interactions are described in more detail herein.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Example Blockchain System

With respect to the figures, FIG. 1A is a system diagram that illustrates the components of a blockchain system. As shown in FIG. 1A, a blockchain A network 112 corresponding to a blockchain A may include one or more blockchain A peers 102 that are each running a blockchain A platform 110; one or more data blockchain A miners 104 that are each running the blockchain A platform 110; and/or one or more blockchain A clients 106 that are each running the blockchain A platform 110. These components of the blockchain A network 112, including the blockchain A peers 102, the blockchain A miners 104, and the blockchain A clients 106, may be communicatively coupled via a network 120. The blockchain A platform 110 may include code that, when executed, enables blockchain A functionality. For example, the code can include smart contract code that defines functions that can be called by a blockchain A peer 102, a blockchain A miner 104, or a blockchain A client 106 (e.g., the smart contract code may define transactions that can be submitted by any of the components of the blockchain A network 112, including the information to include in a transaction (e.g., information to include in a public key registration transaction, a block commit transaction, an IP address registration transaction, a create transaction, an insert transaction, a delete transaction, etc.)) and/or proof of burn code that includes rules or instructions that define how a sortition to select a miner to generate a new block in the blockchain A is to occur.

The blockchain A peers 102 and the blockchain A miners 104 may be virtual or physical computing devices in the blockchain A network 112. For example, the blockchain A peers 102 may be virtual or physical computing devices that store an incomplete or complete copy of the blockchain A and that can verify some or all transactions that have occurred since the genesis of the blockchain A. The blockchain A miners 104 may be physical or virtual computing devices that form new blocks in the blockchain A (e.g., mine new blocks in the blockchain A), where some devices may also store an incomplete or complete copy of the blockchain A and/or obtain information about the blockchain A from other peers 102 and/or miners 104. The blockchain A clients 106 may be physical or virtual computing devices that submit a transaction to the blockchain A network 112, such as physical or virtual computing devices operated by a user of an application that uses the blockchain A network 112, physical or virtual computing devices or servers operated by an entity that provides or operates an application that uses the blockchain A network 112, and/or the like. The blockchain A clients 106 may be capable of communicating with, and querying information from, the blockchain A peers 102 in the blockchain A network 112. In some embodiments, the blockchain A peers 102, blockchain A miners 104, and/or blockchain A clients 106 may each operate on one or more hardware computing devices or servers that are communicatively coupled to network 120 and include a processor, a memory, and network communication capabilities. In some embodiments, the blockchain A peers 102, blockchain A miners 104, and/or blockchain A clients 106 may each operate on a system of one or more computers, one or more virtual machines executing on a system of one or more computers, as a cloud computing service (e.g., on a cluster of computing devices), and so forth.

The network 120 can be of a conventional type, wired or wireless, and may have numerous different configurations including a star configuration, token ring configuration or other configurations. Furthermore, the network 120 may include a local area network (LAN), a wide area network (WAN) (e.g., the Internet), and/or other interconnected data paths across which multiple devices may communicate. In some implementations, the network 120 may be a peer-to-peer network. The network 120 may also be coupled to or include portions of a telecommunications network for sending data in a variety of different communication protocols. In some implementations, the network 120 includes Bluetooth communication networks or a cellular communications network for sending and receiving data including via short messaging service (SMS), multimedia messaging service (MMS), hypertext transfer protocol (HTTP), direct data connection, WAP, email, etc.

There may be a blockchain B network 132 corresponding to a blockchain B that may similarly include one or more blockchain B peers 122 that are each running a blockchain B platform 130; one or more data blockchain B miners 124 that are each running the blockchain B platform 130; and/or one or more blockchain B clients 126 that are each running the blockchain B platform 130. These components of the blockchain B network 132, including the blockchain B peers 122, the blockchain B miners 124, and the blockchain B clients 126, may be communicatively coupled via a network 130.

In some embodiments, the blockchain A may be partly dependent on the blockchain B. For instance, a cryptocurrency used in conjunction with the blockchain B may be used to perform a sortition (e.g., a proof-of-burn sortition, a proof-of-work sortition, a proof-of-stake sortition, combinations thereof, and/or the like) to select a miner for a new block in the blockchain A, such as the sortition described in U.S. Pat. No. 10,698,728, entitled "SYSTEMS AND METHODS FOR FORMING APPLICATION-SPECIFIC BLOCKCHAINS," which is hereby incorporated by reference herein in its entirety. Thus, components of the blockchain A network 112 may be able to reference information from the blockchain B if needed.

Figure 1B:
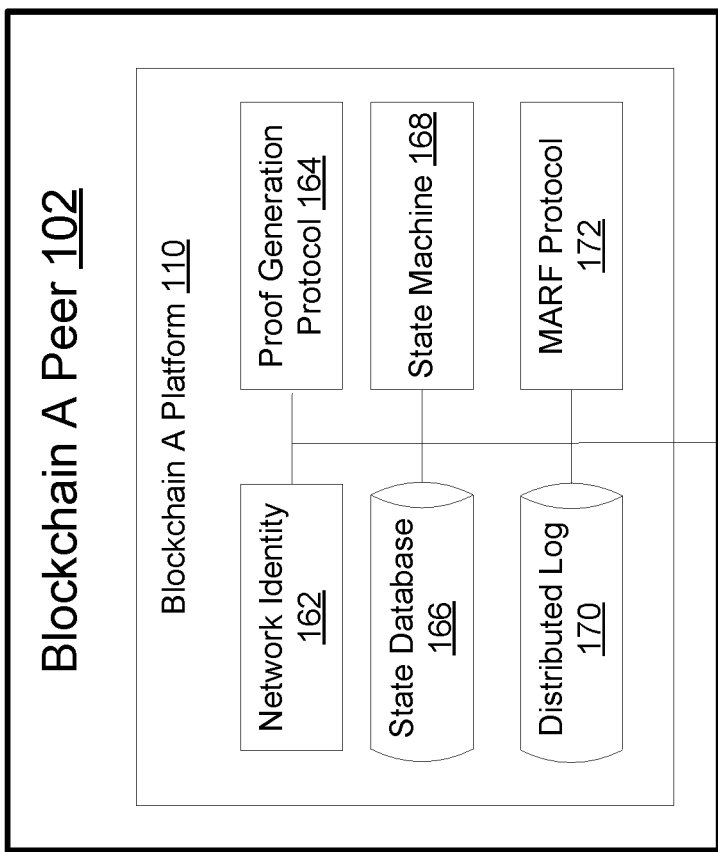
FIG. 1B is a blockchain diagram that illustrates the components of the blockchain A platform running on a blockchain A peer of FIG. 1A.

FIG. 1B is a blockchain diagram that illustrates the components of the blockchain A platform 110 running on a blockchain A peer 102 of FIG. 1A. The blockchain A platform may include the executable code described above with respect to FIG. 1A. As illustrated in FIG. 1B, the blockchain A platform 110 may also include a network identity 162, a proof generation protocol 164, a state database 166, a state machine 168, a distributed log 170, and a MARF protocol 172. In some embodiments, these components may be locally stored on the blockchain A peer 102 and/or executable by the blockchain A peer 150. It should be understood that any of the blockchain A peers 102, the blockchain A miners 104, and/or the blockchain A clients 106 depicted in FIG. 1A may include none, some, or all of the components of the blockchain A platform 110 depicted in FIG. 1B.

The distributed log 170 may be a local copy of some or all of the blocks and transactions incorporated into the blockchain A. Multiple blockchain A peers 102 may each have a distributed log 170, allowing data and transactions to be stored in a decentralized manner. However, as referred to herein, the term blockchain may be thought of as a global distributed log or the consensus of all of the data collectively recorded across each of the peers or nodes in the blockchain network. In some embodiments, the distributed log 170 may be maintained in accordance with the authenticated index data structure described herein. The MARF protocol 172 may enable the blockchain A peer 102 (or miner 104 or client 106) to properly navigate the data structure and interpret the information in the distributed log 170.

The state machine 168 may be configured to execute one or more transactions in the distributed log 170. The state database 166 may store state information obtained by the state machine 168 in response to executing one or more transactions in the distributed log 170. As such, the blockchain A platform 110 allows any number of the peers 102, the miners 104, and/or the clients 106 to utilize a state machine replication scheme or process in which two inputs are inputted into the state machine 168.

The network identity 162 can identify the blockchain A peer 102 (or miner 104 or client 106) and/or a user registered thereon in response to communications received over the blockchain A network 112. The proof generation protocol 164 may be configured to generate proofs that can be used by a blockchain A peer 102 (or miner 104 or client 106) to provide validation in accordance with the authenticated index data structure of the blockchain A.

Overview of a Merklized Adaptive Radix Forest (MARF)

A blockchain can be used as a log of transactions, and each transaction can be thought of as a state transition in a replicated state machine. Thus, at the end of processing a transaction (e.g., transaction n), it is possible to characterize the entire state of the system as a materialized view of the system (e.g., from transaction 0 to transaction n).

However, the implementation of a blockchain involves numerous concerns. One concern is that a blockchain can fork, and the existence of forks means that there can be multiple different materialized views. Any implementation should accommodate the existence of multiple divergent histories and maintain awareness of all of the "chain tips" of the various forks (e.g., the implementation should not just take the materialized view of the longest fork). Thus, it may be desirable that the blockchain peers be able to process all the forks and keep their blocks around.

Furthermore, a fork can happen at any block in the blockchain (e.g., a miner may produce a fork at any block height in the past), and there can be infinitely many forks in the blockchain. This means that a blockchain peer may also calculate and validate the materialized view of each fork, no matter where each fork occurs in the blockchain or the order in which the peer discovers the forks. The peer may perform this calculation and validation because a client may request a proof for some state in any fork, and, in order to service such a request, the peer has to calculate the materialized view for all forks.

Another concern is that blocks have arbitrary arrival orders (this is to prevent a network operator from causing a peer to spend an inordinate amount of time processing blocks by varying the order in which the blocks arrive at the peer), which means that blocks can be discovered in different orders by the peer or node processing the blocks. Accordingly, this means that how blocks are processed should be independent of the arrival order of the blocks; the runtime cost of calculating the materialized view should be independent of the order in which forks are produced, as well as the order in which their blocks arrive. Processing blocks independently of the arrival order may help avoid denial-of-service vulnerabilities, whereby a network attacker can control the arrival schedules of both forks and blocks in a bid to force each peer to expend resources to validate the fork. For instance, a network operator could force a peer to jump and back forth between validating the two longest forks in attempts to cause the peer to crash. By processing blocks independently of the arrival order, it may be impossible for an attacker to significantly slow down the peer network by maliciously varying either schedule.

There is also an additional concern that the materialized view of each block should include a cryptographic commitment. If a user would like to query some information (e.g., a balance of their user account) from a peer or node that is not in the user's control, the user would want extra assurance that the returned information is correct (e.g., the user does not want to be lied to by the peer or node). In order to provide this validation, an authenticated index data structure can be used, such that as long as the user knows some cryptographic hash, an untrusted node can submit the answer to the user's query along with a cryptographic proof that the answer is consistent with the known public algorithm for generating that hash.

These concerns serve as non-trivial constraints for the design of the data structures used for tracking and encoding all the materialized views in the blockchain. In order to address these concerns, described herein is an authenticated index data structure called a Merklized Adaptive Radix Forest (MARF) that can be used to efficiently encode all the transactions and blocks in a blockchain.

Figure 2:
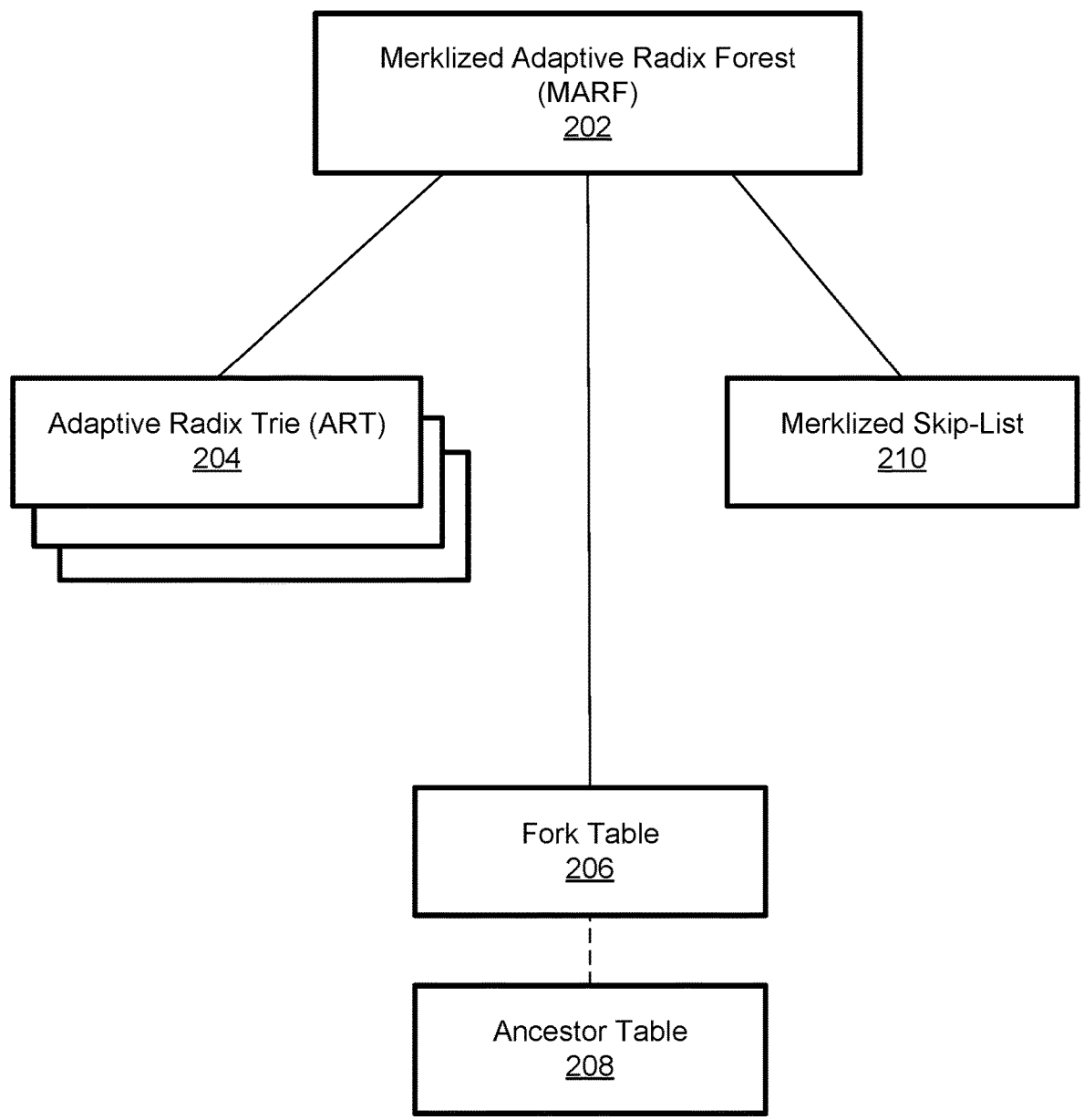
FIG. 2 illustrates the overall structure and components of a MARF used to encode a blockchain.

In some embodiments, the MARF data structure may comprise one or more data structures. FIG. 2 illustrates the overall structure and components of a MARF 202 used to encode a blockchain: (1) a merklized adaptive radix trie (ART) 204 for each block in the blockchain; (2) a fork table 206 (and accompanying ancestor table 208) that keeps track of the chain tips of one or more forks and parent/child relationships between blocks; and (3) a merklized skip-list 210 that cryptographically links merklized ARTs in prior blocks to the current block.

Each ART 204 can be used to efficiently store a hash table and represent a set of key-value pairs. In particular, a peer 102 or miner 104 can hash the keys to obtain paths and the paths map to the corresponding values. In other words, a key-value pair can be represented as a node in the trie with a path that is the hash of the key. In each ART 204, every non-leaf node (e.g., intermediate node) includes the hash of its children node(s). The root node can include a root hash, which is a hash of the hashes of the intermediate nodes—effectively representing the entire trie.

A peer 102 or miner 104 may encode transactions in a block as a sequence of inserts and/or lookups in the corresponding ART 204 for that block. For example, a peer 102 or miner 104 can add key-value pairs representing a transaction in a block in the corresponding ART 204 for that block. The ART 204 for a block may also include a new type of node—back-pointers—that can be used to refer to entire subtrees from a prior block's ART 204. From the root node in the ART 204 of the current block (e.g., block N), a peer 102, miner 104, or client 106 can quickly query the children node or key-value pairs of any prior ART 204 (e.g., block N−1, and so forth) through the use of back-pointers. The fork table 206 and the merklized skip-list 210 further assist in tying together the ARTs 204 of different blocks in the blockchain and allows multiple, fully materialized views of the blockchain to be efficiently recorded and produced.

This overall structure of the MARF 202 provides numerous technical innovations and benefits. Back-pointers, the fork table 206, and/or the merklized skip-list 210 allow the concept of the adaptive radix trie to be adapted for representing multiple, conflicting materialized views of the blockchain. Furthermore, these implementations makes the MARF 202 structure authenticatable. If a client 106 is aware of the root hash of the materialized view at a particular block, the client 106 can cryptographically verify the existence of any key-value pair in that materialized view based on a cryptographic proof of inclusion provided by a peer 102 or miner 104 (that cannot be forged).

These components of the MARF 202 data structure and their interactions are described in more detail herein.

Overview of a Merklized Adaptive Radix Trie (ART)

A trie is a prefix tree data structure having one or more nodes. Each node may point to one or more child nodes, and conversely multiple nodes can share a single parent node. The node at the start of the tree is the root node and is the only node with no parent node. If a node is not a root node and has at least one child node, the node may be referred to herein as an intermediate node. If a node has no child nodes, it is referred to herein as a leaf node or leaf.

An adaptive radix trie (ART) is a trie in which each node's branching factor varies with the number of children. In particular, a node's branching factor increases according to a schedule (e.g., 0, 4, 16, 48, 256) as more and more children are added. Nodes can be referred to as node4, node16, node48, and node256 to indicate the branching factor of the node and the potential number of intermediate or leaf nodes that can branch off the node. An empty trie may include a single node256 that represents the root node of the trie.

A child pointer corresponding to a child node may be listed in a child pointer array of a parent node in the order in which the child pointer is inserted into the array in relation to other child pointers corresponding to other child nodes of the parent node. A child pointer listed in an array may include a 1-byte node ID of the corresponding child node, a 1-byte path character of the corresponding child node, and/or a 4-byte back-pointer to the corresponding child node (big-endian). Thus, a child pointer may occupy one byte within memory. A node4, node16, and node256 can each have an array of 4, 16, and 256 child pointers respectively. A node48 can have an array of 48 child pointers, followed by a 256-byte array of indices that map each possible byte value to an index in the child pointer array (or to 0xff if the index slot is unoccupied). While searching for a child node in a node4 or node16 may involve a peer 102, a miner 104, and/or a client 106 performing a linear scan of the child pointer array of the corresponding parent node, searching for a child node in a node48 may involve a peer 102, a miner 104, and/or a client 106 looking up the index of the child node in the child pointer array of the node48 using the path character byte as an index into the node48's 256-byte child pointer index, and then using that index to look up the child pointer. A peer 102, a miner 104, and/or a client 106 can insert a child pointer for a child node into the child pointer array of a node256 by using the 1-byte path character as the index.

The variation in the branching factors of nodes of an ART, combined with the usual sparse trie optimizations of lazy expansion and path compression, can produce a tree-like index over a set of key-value pairs that is shallower than a perfectly-balanced binary search tree over the same values. In other words, a peer 102, a miner 104, and/or a client 106 can use path compression and/or lazy expansion to efficiently represent all key-value pairs while minimizing the number of trie nodes. More specifically, if two children share a common prefix, a peer 102, a miner 104, and/or a client 106 can store the prefix bytes in a single intermediate node instead of being spread across multiple intermediate nodes (e.g., which is an example of path compression). In embodiments in which a path suffix uniquely identifies the leaf, a peer 102, a miner 104, and/or a client 106 can store the path suffix alongside the leaf instead of as a sequence of intermediate nodes (e.g., which is an example of lazy expansion). As additional key-value pairs are inserted, a peer 102, a miner 104, and/or a client 106 can split the intermediate nodes and leaves with multi-byte paths into more nodes.

These features of an ART are described in greater detail below with respect to FIGS. 3A-3E. The present disclosure explains that generation of an ART, ART path compression, ART lazy expansion, and/or any other modifications made to an ART can be performed by a peer 102, a miner 104, and/or a client 106. However, for illustrative purposes and ease of explanation, the following describes such actions as being performed by a peer 102 after a new block is added to a blockchain for the purposes of producing an ART that describes each key-value pair modified in the new block and/or in prior blocks.

Figure 3A:
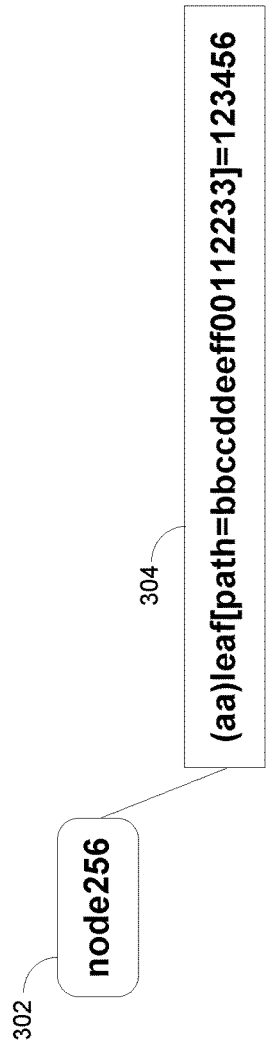
FIGS. 3A-3E illustrate various features of a merklized adaptive radix trie (ART).

FIG. 3A illustrates a trie 300 (e.g., an ART) that includes a root node 302 and a leaf node 304 branching off the root node 302. A peer 102 may have created the root node 302 and the leaf node 304 in response to the generation of a new block in a blockchain by a miner 104. In particular, the peer 102 may have created the root node 302 and the leaf node 304 to represent a specific key-value pair modified in the new block.

The root node 302 is a node256 (e.g., the root node 302 has a branching factor of 256). The notation of (ab)node256 means "a node256 that descends from its parent node via byte 0xab." The notation of node256[path=abcd] means "a node256 that has a shared prefix, abcd, with the children nodes of the node256." Here, leaf node 304 is located at path "aabbccddeeff00112233," where the path is a hash of the key in the key-value pair represented by the leaf node 304, and descends from root node 302 via byte 0xaa. While the leaf node 304 has no children nodes, the leaf node 304 may share the prefix "bbccddeeff00112233" with one or more possible child nodes. Finally, the value of the leaf node 304, 123456, is a hash of the value in the key-value pair represented by the leaf node 304. In other words, the leaf node 304 encodes the key-value pair modified in the new block as "aabbccddeeff00112233=123456."

With lazy expansion, if a leaf has a non-zero-byte path suffix, and the peer 102 inserts another leaf that shares part of the suffix, the peer 102 will split the common bytes off of the existing leaf to form a node4, whose two immediate children are the two leaves. Each of these two leaves will store the path bytes that are unique to them.

Figure 3B:
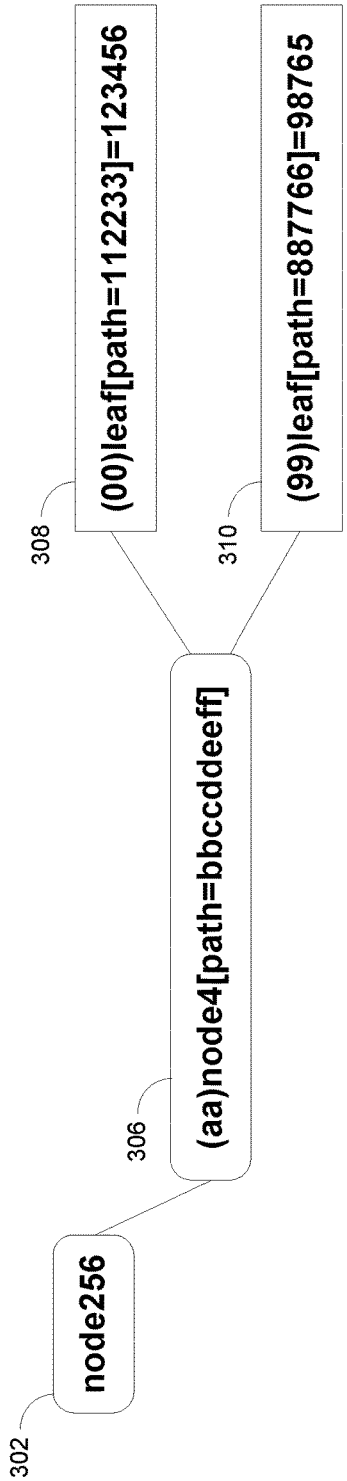

For example, if a peer 102 inserts a new transaction into the trie 300 that represents a second key-value pair modified in the new block, a hash of the value in the second key-value pair is "98765," and a hash of the key in the second key-value pair is "aabbccddeeff998877" (which shares part of the path of leaf node 304, e.g., "aabbccddeeff"), then the peer 102 may split the inserted path and the path of leaf node 304 into a shared prefix and a distinct suffix. The peer 102 can use the shared prefix, "aabbccddeeff," to form a node4 with two immediate children distinct suffixes. The resulting updated trie 300 is illustrated in FIG. 3B, which now includes an intermediate node 306 branching off the root node 302. Branching off the intermediate node 306 are leaf nodes 308 and 310. The intermediate node 306 and the leaf node 308 together encode the first key-value pair modified in the new block as "aabbccddeeff00112233=123456." Similarly, the intermediate node 306 and the leaf node 310 together encode the second key-value pair modified in the new block as "aabbccddeeff99887766=98765."

As an intermediate node with a small radix gains children, such as the intermediate node 306, the intermediate node may eventually need to be promoted to a node with a higher radix. The peer 102 may convert a node4 into a node16 when the node4 is about to receive a fifth child node, may convert a node16 into a node48 when the node16 is about to receive a 17th child node, and may convert a node48 into a node256 when the node48 is about to receive a 49th child node. The peer 102 may not promote a node256 because the node256 may include slots for child pointers with all possible byte values (e.g., there may be 256 possible byte values and the node256 can have up to 256 child nodes). Node promotion is described in greater detail below with respect to FIGS. 3C-3D.

Figure 3C:
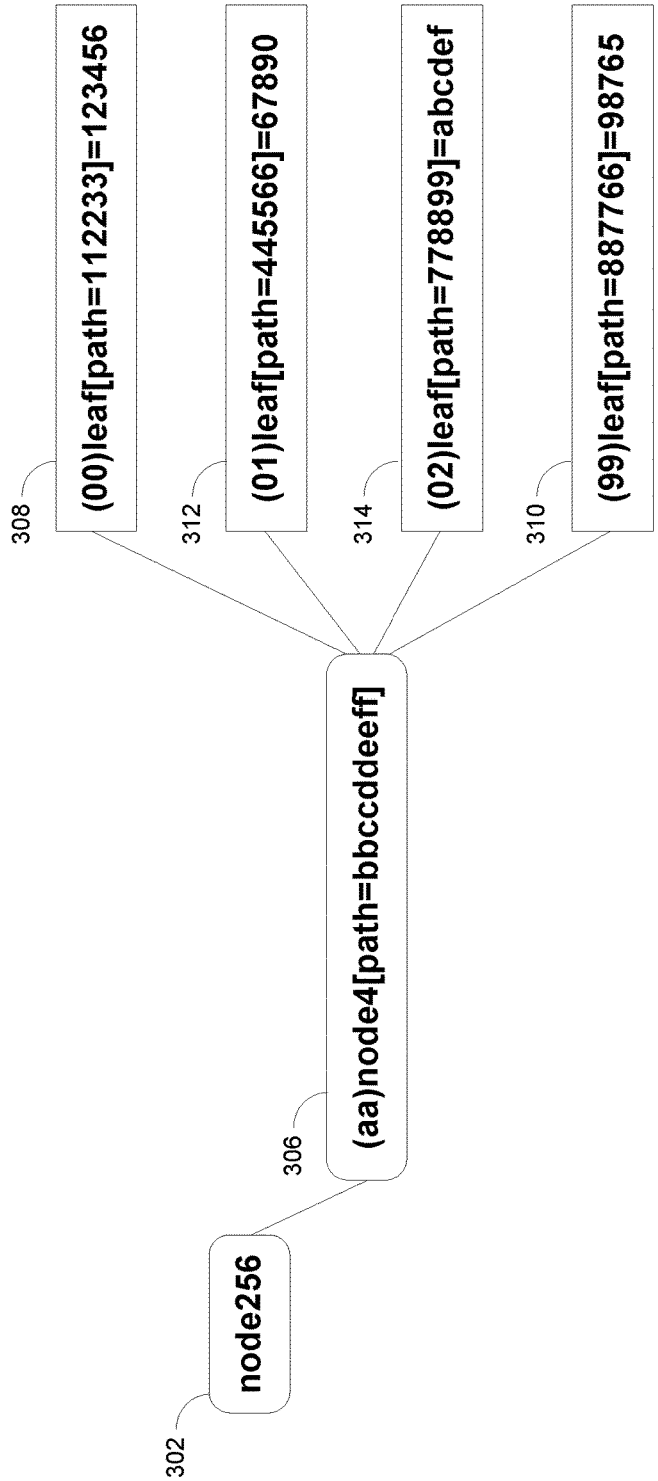

As illustrated in FIG. 3C, the peer 102 has added two leaf nodes 312 and 314 to the intermediate node 306 of the updated trie 300 shown in FIG. 3B. For example, the peer 102 may have added the leaf node 312 in response to adding a transaction into the trie 300 that represents a third key-value pair modified in the new block, and may have added the leaf node 314 in response to adding a transaction into the trie 300 that represents a fourth key-value pair modified in the new block. Accordingly, the updated trie 300 illustrated in FIG. 3C includes the root node 302, the intermediate node 306 (a node4) branching off the root node 302, and four leaf nodes branching off the intermediate node 306: the leaf node 308, the leaf node 310, the leaf node 312, and the leaf node 314.

The peer 102 may set the value of the leaf node 312 to be "67890" by taking a hash of the value in the third key-value pair modified in the new block. Similarly, the peer 102 may set the value of the leaf node 314 to be "abcdef" by taking a hash of the value in the fourth key-value pair modified in the new block. Thus, the intermediate node 306 and the leaf node 308 together may encode the first key-value pair modified in the new block as "aabbccddeeff00112233=123456," the intermediate node 306 and the leaf node 312 together may encode the third key-value pair modified in the new block as "aabbccddeeff01445566=67890," the intermediate node 306 and the leaf node 314 together may encode the fourth key-value pair modified in the new block as "aabbccddeeff02778899=abcdef," and the intermediate node 306 and the leaf node 310 together may encode the second key-value pair modified in the new block as "aabbccddeeff99887766=9876."

Figure 3D:
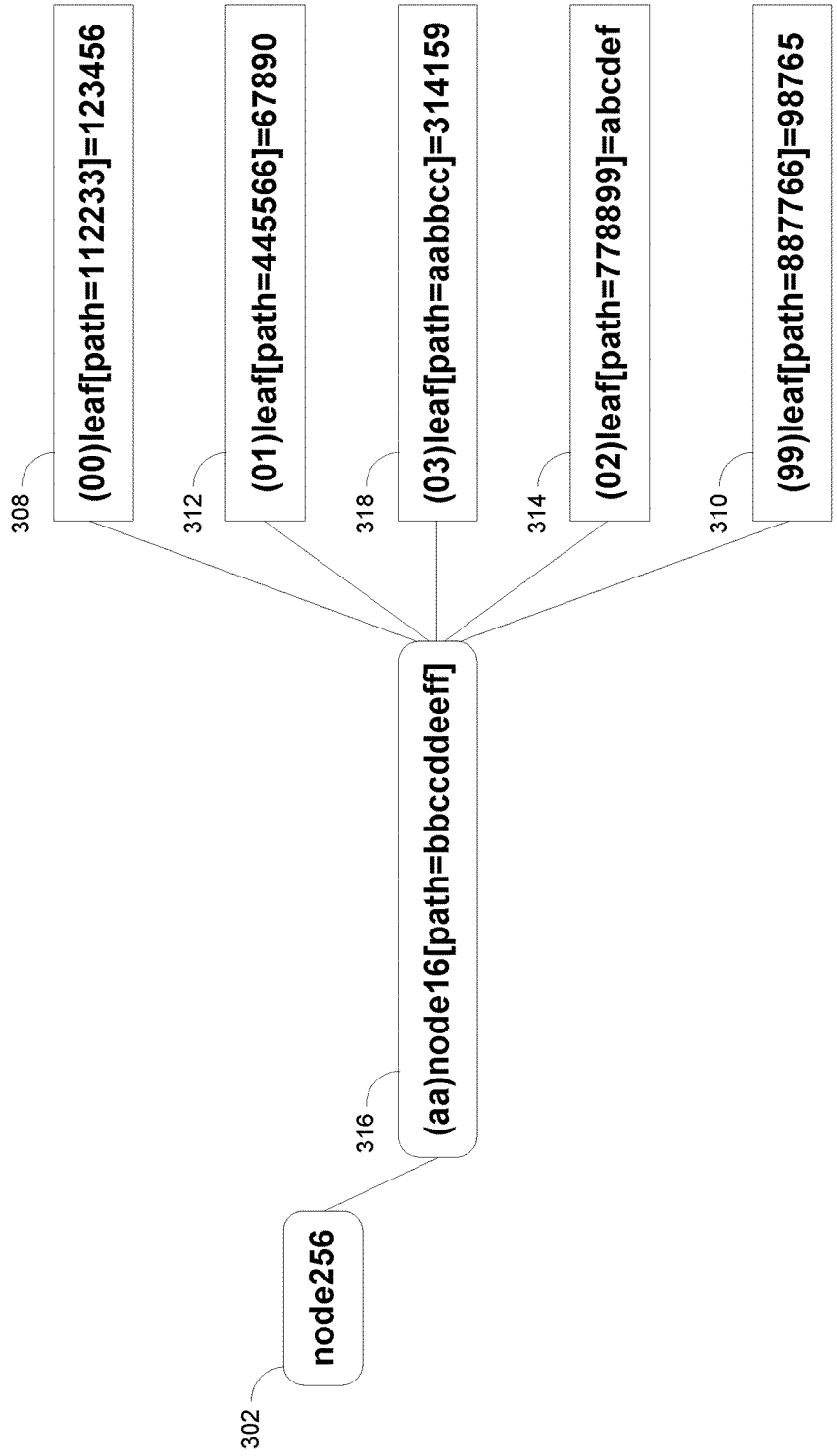

Since the intermediate node 306 is a node4, the peer 102 inserting one more node with a prefix of "aabbccddeeff" (e.g., the shared prefix encoded by intermediate node 306) into the trie 300 may result in the peer 102 promoting the intermediate node 306 from a node4 to a node16. For example, if the peer 102 determines that a hash of a value in a fifth key-value pair modified in the new block is "314159" and a hash of a key in the fifth key-value pair modified in the new block results in a path of "aabbccddeeff03aabbcc," then the peer 102 may determine that another child node should be added to the intermediate node 306 and promote the intermediate node 306 into a node16, as illustrated in FIG. 3D. In particular, the peer 102 may replace the intermediate node 306 with intermediate node 316 that is a node16, and add new leaf node 318 branching off this intermediate node 316 for a total of five leaf nodes: leaf nodes 308, 310, 312, 314, and 318. The peer 102 may set the value of the leaf node 318 to be "314159" by taking a hash of the value in the fifth key-value pair modified in the new block. Thus, the intermediate node 316 and the leaf node 308 together may encode the first key-value pair modified in the new block as "aabbccddeeff00112233=123456," the intermediate node 316 and the leaf node 312 together may encode the third key-value pair modified in the new block as "aabbccddeeff01445566=67890," the intermediate node 316 and the leaf node 318 together may encode the fifth key-value pair modified in the new block as "aabbccddeeffaabbcc=314159," the intermediate node 316 and the leaf node 314 together may encode the fourth key-value pair modified in the new block as "aabbccddeeff02778899=abcdef," and the intermediate node 316 and the leaf node 310 together may encode the second key-value pair modified in the new block as "aabbccddeeff99887766=98765."

An intermediate node may store a path prefix shared by all of the children node(s) of the intermediate node. For instance, the updated trie 300 illustrated in FIG. 3D has five leaf nodes 308, 310, 312, 314, and 318 branching off the intermediate node 316 and sharing a path prefix of "bbccddeeff." If the peer 102 inserts a new node that shares some of, but not all of, this shared prefix, the peer 102 can "decompress" the path by splicing a new leaf node into the compressed path. The peer 102 may attach the new leaf node to a node4 whose two children are this new leaf node and the existing node (e.g., the node16 in this case, intermediate node 316). The shared path of the existing node may now include the suffix unique to the children nodes of the existing node, but that is distinct from the newly-spliced leaf node.

Figure 3E:
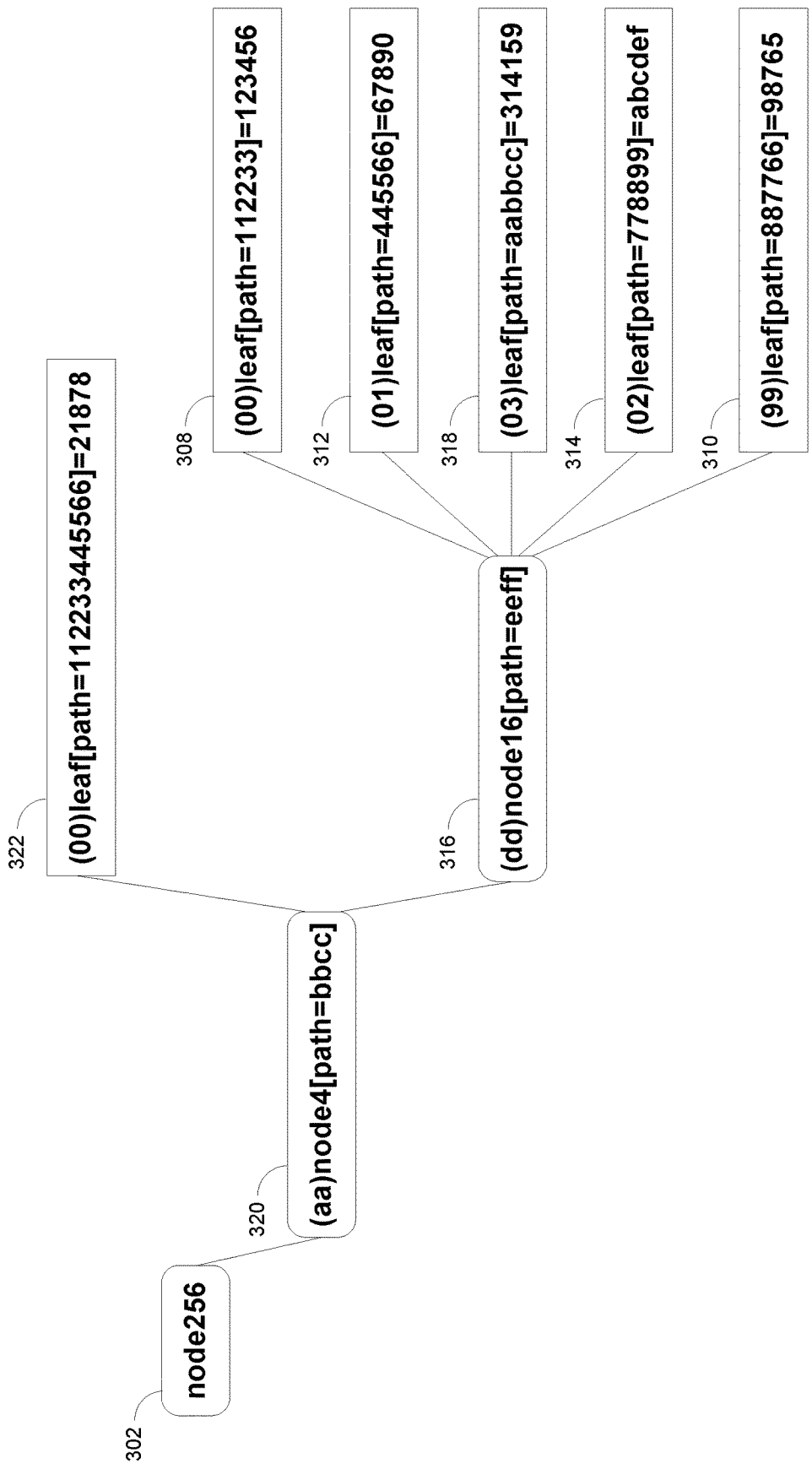

For example, if the peer 102 determines that a hash of a value in a sixth key-value pair modified in the new block is "21878" and a hash of a key in the sixth key-value pair modified in the new block results in a path of "aabbcc001122334455," then the peer 102 may determine that a new leaf node should be spliced into the compressed path. In particular, the peer 102 can decompress the path of the intermediate node 316 to "eeff" (since "eeff" is not shared by new leaf node 322 being added), add leaf node 322 with the distinct suffix of "1122334455," and add a new intermediate node 320. The new intermediate node 320 may be a child node of the root node 302, a parent node to both the new leaf node 322 and the modified intermediate node 316, and have a path prefix of "bbcc" (since "bbcc" is shared by both the decompressed intermediate node 316 and the new leaf node 322), as illustrated in FIG. 3E.

Thus, the intermediate node 320, intermediate node 316, and the leaf node 308 together may encode the first key-value pair modified in the new block as "aabbccddeeff00112233=123456;" the intermediate node 320, the intermediate node 316, and the leaf node 312 together may encode the third key-value pair modified in the new block as "aabbccddeeff01445566=67890;" the intermediate node 320, the intermediate node 316, and the leaf node 318 together may encode the fifth key-value pair modified in the new block as "aabbccddeeff03aabbcc=314159;" the intermediate node 320, the intermediate node 316, and the leaf node 314 together may encode the fourth key-value pair modified in the new block as "aabbccddeeff02778899=abcdef;" the intermediate node 320, the intermediate node 316, and the leaf node 310 together may encode the second key-value pair modified in the new block as "aabbccddeeff99887766=98765;" and the intermediate node 320 and the leaf node 322 together may encode the sixth key-value pair modified in the new block as "aabbcc00112233445566=21878."

Accordingly, it can be understood from the depictions in FIGS. 3A-3E how a peer 102 can efficiently encode the information for each block in a blockchain using an ART, and how a peer 102 can represent the entire blockchain using a sequenced set of ARTs (with each ART representing a different block in the chain).

As described above, however, a blockchain can include one or more forks. The materialized view of a fork can include key-value pairs for data produced by applying some or all of the transactions in that fork (e.g., thereby representing a cumulative history of transactions stored in blocks of the fork), not just transactions in the last block of the fork. As such, the index over all key-value pairs in a fork can be encoded in the sequence of merklized ARTs for blocks in the fork. In order to ensure that reads and writes on a fork's materialized view remain fast no matter which block ART is queried, a child pointer in an ART can point to either a node in the same ART, or a node with the same path in a prior ART.

For example, if the ART at block N in the blockchain has a node16 whose path is "aabbccddeeff," and ten blocks ago (e.g., at block N−10) a leaf node was inserted at path "aabbccddeeff99887766," then the node16 in the ART at block N can include a child pointer to an intermediate node in the ART at block N−10 that has the path of "aabbccddeeff" and has a child node in slot 0x99. The child pointer can be referred to herein as a back-pointer given that the child pointer points to the ART of a previous block in the fork.

Figure 4A:
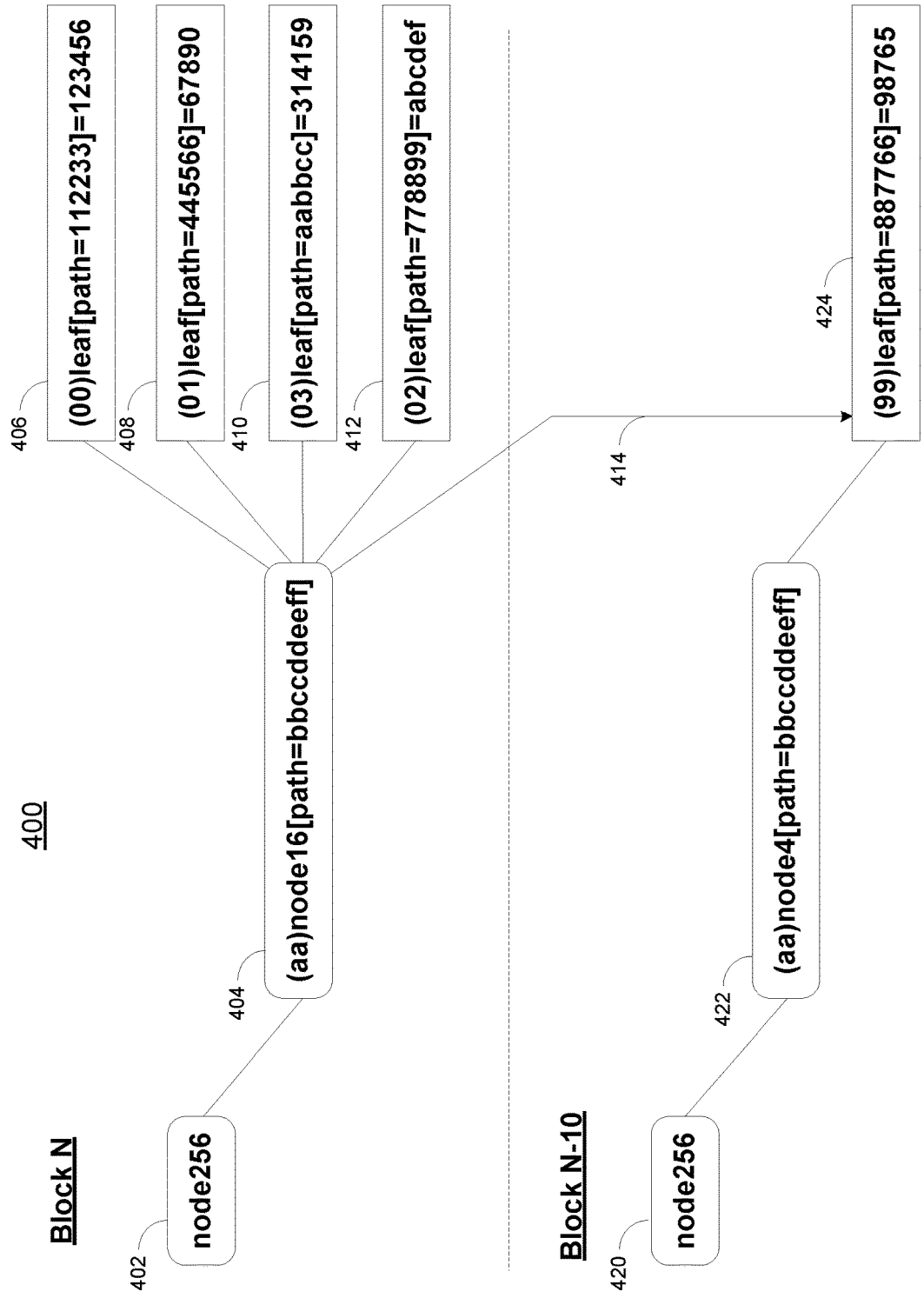
FIG. 4A illustrates a visual representation of a back-pointer.

FIG. 4A illustrates a visual representation of a back-pointer. As illustrated in FIG. 4A, ART 450 for block N−10 in a fork has a root node 420 and an intermediate node 422 (a node4) branching off the root node 420. Branching off the intermediate node 422 is a leaf node 424 corresponding to a path of "aabbccddeeff99887766." The intermediate node 422 and the leaf node 424 together may encode a key-value pair modified in block N−10 as "aabbccddeeff99887766=98765."

A miner 104 may eventually generate a block N in the fork that has a block height that is greater than the block height of block N−10 by 10. In other words, block N and block N−10 may be blocks in the same fork, with block N being cryptographically linked to block N−1, block N−1 being cryptographically linked to block N−2, block N−2 being cryptographically linked to block N−3, and so on.

A peer 102 may initially generate an ART 400 for block N that includes root node 402. The peer 102 may then begin to process a transaction in which a first key-value pair is modified. For example, the transaction may indicate a new value for a particular key. As a result, the peer 102 can hash the key and hash the value in the first key-value pair. If the hash of the key results in a path like "aabbccddeeff00112233" and the hash of the value results in "123456," then the peer 102 can insert the hash of the value at the path determined by hashing the key in the ART 400. Because the determined path shares a prefix with the path corresponding to the intermediate node 422 in the ART 450 of block N−10, the peer 102 can initially add a child to the root node 402 that is a back-pointer to the intermediate node 422 in child slot 0xaa. The peer 102 can then walk the path "aabbccddeeff" using the back-pointer starting at root node 402. While walking the path, the peer 102 can copy the intermediate node 422 and add the copy of the intermediate node 422 as a child node to the root node 402 in child slot 0xaa, thereby replacing the initial back-pointer. The peer 102 may perform this copy operation because the intermediate node 422 and the determined path share the prefix. Because the intermediate node 422 does not have a child node that shares any portion of the determined path aside from the shared prefix, the peer 102 can then add another back-pointer to the leaf node 424 as a child of the copy of the intermediate node 422 added to the ART 400 in child slot 0x99. Thus, the ART 400 may include a copy of the intermediate node 422 as a child node of the root node 402, and a back-pointer to the leaf node 424 as a child of the copy of the intermediate node 422. The peer 102 may then add another child node to the copy of the intermediate node 422 to encode the first key-value pair modified in block N given that the path derived from the modified first key-value pair does not share any commonality with the paths of any of the current children of the intermediate node 422 aside from the shared prefix. Specifically, the peer 102 may add a leaf node 406 that is a child node of the copy of the intermediate node 422 that, with the copy of the intermediate node 422, encodes the first key-value pair modified in block N in the ART 400. Accordingly, the copy of the intermediate node 422 has two children: the leaf node 406 and a back-pointer to the leaf node 424.

There may be other key-value pairs modified in block N that, when the corresponding keys are hashed by the peer 102, cause the peer 102 to determine that the paths for these other modified key-value pairs share the same prefix as the path for the modified first key-value pair. As a result, the peer 102 can add new leaf nodes as child nodes of the copy of the intermediate node 422 in the ART 400 to encode these other modified key-value pairs.

However, as illustrated in FIG. 4A, the intermediate node 422 is a node4 and therefore the copy of the intermediate node 422 is a node4 as well. If the peer 102 continues to add child nodes to the copy of the intermediate node 422 in ART 400, then the peer 102 may have to convert the copy of the intermediate node 422 from a node4 to a node16 once the number of children starts to exceed 4 (where the number of children includes the back-pointer to the leaf node 424).

For example, the peer 102 may eventually attempt to add a fifth child to the copy of the intermediate node 422 in the ART 400. In response, the peer 102 may convert the copy of the intermediate node 422 from a node4 into an intermediate node 404 that is a node16. The new intermediate node 404 may maintain the child nodes of the copy of the intermediate node 422 and include the fifth child. FIG. 4A illustrates the end result of the peer 102 adding a fifth child to the now intermediate node 404 in the ART 400.

As illustrated in FIG. 4A, the ART 400 may include four leaf nodes 406, 408, 410, and 412. The intermediate node 404 and the leaf node 406 together may encode a first key-value pair modified in block N as "aabbccddeeff00112233=123456," the intermediate node 404 and the leaf node 408 together may encode a second key-value pair modified in block N as "aabbccddeeff01445566=67890," the intermediate node 404 and the leaf node 410 together may encode a third key-value pair modified in block N as "aabbccddeeff03aabbcc=314159," and the intermediate node 404 and the leaf node 412 together may encode a fourth key-value pair modified in block N as "aabbccddeeff02778899=abcdef." The intermediate node 404 may also have a back-pointer 414 to the leaf node 424 of the ART 450 at block N−10 (which shares the path prefix of "aabbccddeeff" with the other leaf nodes 406, 408, 410, and 412).

By maintaining trie child pointers in this way, a peer 102 can start at an ART in a current block (or any other block) and look up a value encoded in an ART in a previous block in the same fork as the current block by following one or more back-pointers stored in the current block ART to one or more previous ARTs of one or more previous blocks. A peer 102 can use a fork table, which may be another data structure in the MARF, to resolve back-pointers to nodes of prior ARTs computationally inexpensive, as described in greater detail below.

Figure 4B:
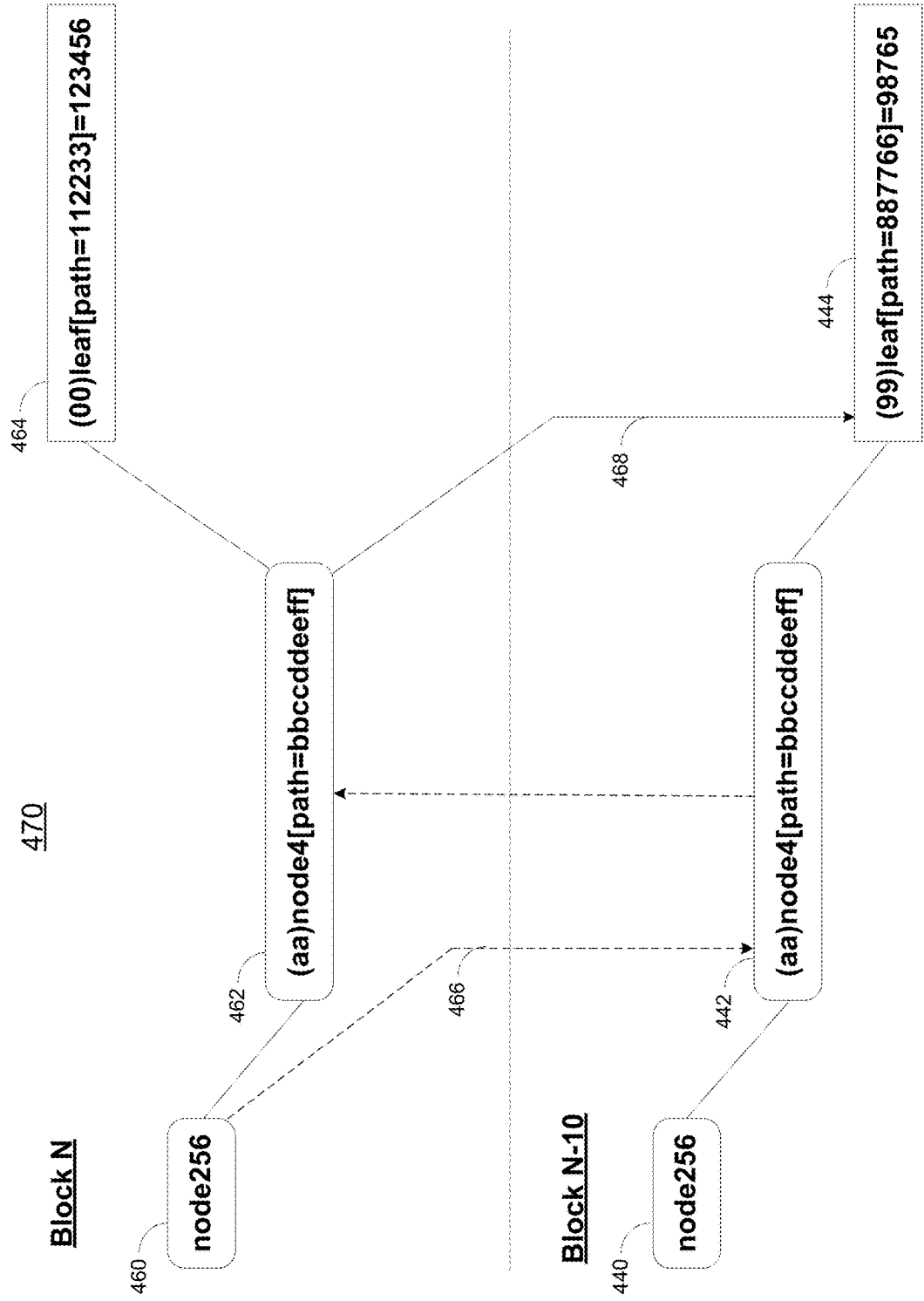
FIG. 4B illustrates a more detailed diagram depicting how the ART for a subsequent block in a fork can be generated using back-pointers to one or more ARTs for one or more previous blocks in the fork.

FIG. 4B illustrates a more detailed diagram depicting how the ART for a subsequent block in a fork can be generated using back-pointers to one or more ARTs for one or more previous blocks in the fork. In order to generate the ART for the next block in the blockchain, a peer 102 can calculate back-pointers in a copy-on-write fashion. For example, when the peer 102 creates a root node for the ART at block N+1, the peer 102 may set some or all of the children of the root node to be back-pointers that point to the immediate children of the root node of the ART of block N. Then, when inserting a key-value pair, the peer 102 can walk the current ART to the insertion point (e.g., the node at which the encoded representation of the key-value pair should be inserted). If the peer 102 encounters a back-pointer, the peer 102 can copy the node pointed to by the back-pointer into the current ART, which will result in the peer 102 setting all non-empty child pointers of the copied node to be back-pointers that point to the corresponding child nodes in one or more ARTs of one or more previous blocks. The peer 102 then continues traversing the current ART until the insertion point is found (e.g., a node has an unallocated child pointer where the leaf should go), copying over intermediate nodes lazily.

As illustrated in FIG. 4B, ART 480 at block N−10 includes a root node 440 that is a node256, an intermediate 442 that is a node4 and that branches off the root node 440, and a leaf node 444 that branches off the intermediate node 442. The intermediate node 442 and the leaf node 444 together encode a particular key-value pair modified in block N−10 as "aabbccddeeff99887766=98765."

If, for example, the peer 102 attempts to insert a key-value pair encoded as "aabbccddeeff00112233=123456" into ART 470 of block N, then the peer 102 may generate the ART 470 for block N by first creating a root node 460 that is a node256 and setting the children of the root node 460 to be back-pointers that point to the immediate children of the root node 440 in the ART 480 (e.g., intermediate node 452). Thus, the root node 460 in block N would initially have a back-pointer 466 to the intermediate node 442 in block N−10 in child slot 0xaa. The peer 102 can then begin to traverse the path "aabbccddeeff00112233" and follow slot 0xaa to the intermediate node 442 in block N−10. The peer 102 can then copy the intermediate node 442 into block N (as intermediate node 462) and set a child pointer of the intermediate node 462 at child slot 0x99 to be a back-pointer 468 to the leaf node 444 in the ART 480 of block N−10. In response, the peer 102 can step to the intermediate node 462 copied into the ART 470 and continue traversing the path, resuming at path bytes "bbccddeeff." When the peer 102 reaches child slot 0x00, the peer 102 sees that this child slot is unallocated. As a result, the peer 102 attaches the new leaf node 464 with the unexpanded path suffix "112233" to the child slot 0x00 (e.g., adds the leaf node 464 as a child node of the intermediate node 462 in the ART 470). As illustrated in FIG. 4B, the back-pointer 468 to the leaf node 444 in the ART 480 is preserved after adding the leaf node 464.

In some embodiments, the hash of an intermediate node that only has leaf nodes as children is the hash of each of the hash values in each of the leaf nodes. For example, if an intermediate node has three leaf nodes as children, then the hash of the intermediate node is the hash of (1) the hash value of the first leaf node (where the hash value of the first leaf node is the hash of the value in the key-value pair represented by the first leaf node); (2) the hash value of the second leaf node; and (3) the hash value of the third leaf node. The hash of an intermediate node that is the parent node of at least one other intermediate node is simply the hash of the children nodes of the intermediate node. Similarly, the hash of a root node (also referred to herein as the root hash of an ART) is simply the hash of the children nodes of the root node. A peer 102, a miner 104, and/or a client 106 may calculate a root hash and/or hashes of nodes in an ART to verify the accuracy of information provided by a peer 102 in response to a query, such as in response to a query for the value of a particular key.

For reasons that are described in greater detail below, when a peer 102, a miner 104, or a client 106 calculates the root hash of an ART, the hash of an intermediate node that has a child that is a back-pointer is calculated differently. Instead of taking the hash of the children of the intermediate node (as would be done if all of the children of the intermediate node were located in the same ART as the intermediate node), the peer 102, the miner 104, and/or the client 106 can determine the root hash of the ART that is referenced by the back-pointer, and take a hash of (1) the determined root hash, (2) the root hash of any other ARTs that are referenced by a back-pointer that is a child of the intermediate node, and/or (3) the hash of any children of the intermediate node that reside in the same ART as the intermediate node. In the previous example shown in FIG. 4B, when calculating the hash of the intermediate node 462, the peer 102, miner 104, and/or client 106 may determine that one of the children of the intermediate node 462 is the back-pointer 468 to the leaf node 444 in the ART 480. Thus, the peer 102, the miner 104, and/or the client 106 may determine the root hash of the ART 480, and take a hash of the root hash of the ART 480 and the value hash of the leaf node 464 (e.g., 123456) to determine the hash of the intermediate node 462.

The peer 102, the miner 104, and/or the client 106 store root hashes of ARTs in RAM or other volatile memory. The peer 102, the miner 104, and/or the client 106, however, may store hashes of child nodes located in different ARTs (e.g., ARTs other than the ART currently being traversed, such as ARTs of previous blocks in the fork) on disk. With the introduction of back-pointers, the peer 102, the miner 104, and/or the client 106 may have to rely on hashes of nodes from prior ARTs if calculating hashes of nodes using the traditional process described above, which could involve multiple disk reads if a current ART includes multiple back-pointers to different, prior ARTs. Reading data from RAM or other volatile memory, however, is faster than reading data from disk. If the peer 102, the miner 104, and/or the client 106 relied on the hashes of nodes in prior ARTs in calculating the hash of a node in a current ART, the time taken to determine a hash of the node in the current ART may depend on the time taken to read data from disk. This time may be significant if multiple disk reads are involved in determining the hash. By storing root hashes in RAM or other volatile memory and using the root hashes of prior ARTs when determining the hashes of one or more nodes in a current ART instead of the hashes of the nodes in prior ARTs, the peer 102, the miner 104, and/or the client 106 can significantly reduce the time taken to validate information provided by a peer 102 without negatively affecting the accuracy of the verification. Accordingly, using back-pointers allows a peer 102 to generate a current, materialized view of a blockchain fork without requiring the peer 102 to copy or add all of the nodes of ARTs of previous blocks in the blockchain fork to the ART of the current block in the blockchain fork. The peer 102 can therefore take advantage of back-pointers to reduce the number of operations that are performed to generate a materialized view of a blockchain fork without increasing the time taken by another peer 102, miner 104, and/or client 106 to verify the accuracy of the information provided by the peer 102 in response to a query (e.g., a query for the value of a key, such as the current value of the key, the value of the key as of a certain time or block in the fork, etc.).

Overview of Fork Tables

As described above, another data structure of a MARF may be a fork table. The fork table may help a peer 102, a miner 104, or a client 106 resolve back-pointers to the appropriate node. The fork table can encode the parent-child relationship between blocks, and thus the relationship between the ARTs of the blocks. More specifically, a fork table can record distinct forks as rows of ART root hashes (e.g., also referred to herein as block header hashes given that the ART may be located in the header of the block) in a table.

Additionally, the MARF may include an ancestor table that serves as a counterpart to the fork table. However, it should be understood that the ancestor table may also be thought of as a component of the fork table. As described herein, depending on context, any references to the fork table may include the ancestor table. The ancestor table can record, for each block, in which row in the fork table is the respective block, the offset of the respective block in the row, and the row and offset for the ART root hash of the parent block of the respective block (together, these four values can constitute a "fork pointer"). The ancestor table can provide an efficient way to identify an ancestor block that is i blocks in the past. For instance, the peer 102, the miner 104, and/or the client 106 can reference the ancestor table to find the fork pointer for the current block and check the parent row in the fork pointer. If the parent is within i blocks back, then the peer 102, the miner 104, and/or the client 106 can use the parent row and offset to look up the root hash of the parent (e.g., in the fork table). Otherwise, the peer 102, the miner 104, and/or the client 106 can subtract the length of the fork row from i, get the first block in this row, and load the fork pointer of the first block from the ancestor table, and repeat (e.g., check if the parent of the first block is within i blocks back). This process for identifying the ART root hash for a prior block can be useful when a client 106 (or peer 102 or miner 104) requests a proof that a returned value hash is accurate given that the proof may include the ART root hashes for a certain set of ancestor blocks, as described in greater detail below.

Thus, the fork table provides an efficient way to encode a child back-pointer in an ART. A back-pointer is the pair of (back-count, node-pointer), where back-count is the number of blocks back (from the current ART's block) to look, and node-pointer is the (disk) pointer to the data of the node in the ART of the prior art in which the node is located (e.g., an offset in the file that encodes the ART where the data of the node can be found).

Figure 5A:
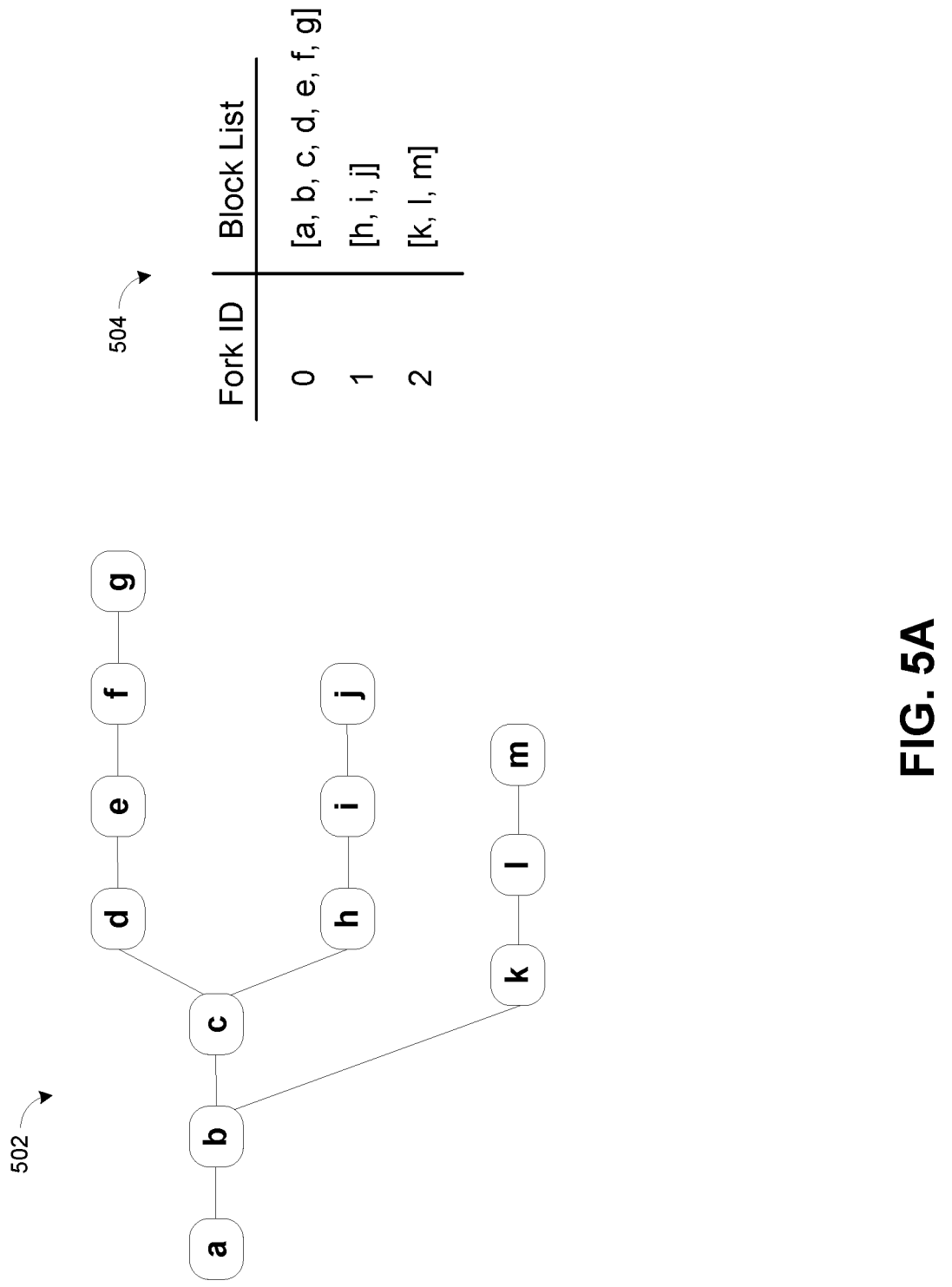
FIG. 5A illustrates an example blockchain state and an example fork table that corresponds to the blockchain state.

FIG. 5A illustrates an example blockchain state 502 and an example fork table 504 that corresponds to the blockchain state 502. FIG. 5B illustrates an example ancestor table 506 that corresponds to the blockchain state 502 and fork table 504 of FIG. 5A.

More specifically, in FIG. 5A, an example blockchain state 502 is shown with thirteen blocks (from a to m) and three distinct forks: a-b-c-d-e-f-g, a-b-c-h-i-j, and a-b-c-k-l-m. A peer 102, a miner 104, and/or a client 106 can encode this blockchain state 502 as the corresponding fork table 504, which has three rows that correspond to the respective forks. Each row in the fork table 504 includes a fork ID and a list of blocks in that fork (more specifically, a list of the ART root hashes (e.g., a hash of the root node of an ART) or block header hashes for the blocks in that fork). For example, the first row of the fork table 504 corresponds to the longest chain in the blockchain state 502 (e.g., a-b-c-d-e-f-g), has a fork id of "0," and a list of the ART root hashes or block header hashes of blocks a, b, c, d, e, f, and g.

The corresponding ancestor table 506 is shown in FIG. 5B. The ancestor table 506 has thirteen rows that correspond to the thirteen blocks (from a to m) of the blockchain state 502. From the ancestor table 506, the chain tips (e.g., of the forks) are straightforward to calculate: for each fork ID whose parent fork ID is the same as the fork ID, the chain tips are the blocks that have the highest index (if there is only one block in a fork row, then that block is the chain tip). In this case, the chain tips are blocks g, j, and m.

The fork table 504 and the ancestor table 506 provide an efficient way to identify an ancestor block that is a certain number of blocks in the past. To demonstrate this further, consider the example of finding the block that is four blocks prior to block m. From the ancestor table 506, it can be seen that block m has fork ID 2. According to the fork table 504, the block list of fork ID 2 is [k, l, m]. The block list has only three items, so the problem becomes instead finding the block that is one block back from the parent of block k. From the ancestor table 506, the parent of block k is from the fork row that has a fork ID of 0 and that has an index of 1. Thus, the parent of block k is block b, and the fork row would be [a, b, c, d, e, f, g]. One block back from block b is block a, which is the block that is four blocks prior to block m.

In some embodiments, the ancestor table 506 grows linearly with the number of blocks, as does the total size of the fork table 504. However, the number of rows in the fork table 504 only grows with the number of distinct forks. While the number of distinct forks is O(B) in the worst case (where B is the number of blocks), the number of rows a peer 102, a miner 104, and/or a client 106 may visit when resolving a back-pointer may be at most $O(\log^2 B)$. However, this scenario may happen if the forks of the blockchain were organized into a perfectly-balanced binary tree. In practice, there will often be one long fork row that encodes the canonical history, as well as a number of short fork rows that encode short-lived forks (which can arise naturally from burn chain reorganizations). This means that resolving back-pointers while working on the longest fork—the fork in which the block rewards for a miner are most likely to be realized—may be O(1) in expectation. To help achieve this, the peer 102, the miner 104, and/or the client 106 can implement the ancestor table 506 as a hash table in order to ensure that finding the ancestor block also runs in O(1) time.

In further embodiments, the fork table 504 and/or the ancestor table 506 can be encoded as one or more key-value pairs within the MARF itself. For example, when creating an ART for a current block in a fork or some time after encoding one or more other key-value pairs in the ART for the current block, a peer 102, a miner 104, and/or a client 106 can add two leaf nodes to the ART that each, alone or together with zero or more intermediate nodes and/or the root node of the ART, represent the fork table 504, the ancestor table 506, or a combination thereof. As an illustrative example, one of the leaf nodes, alone or together with zero or more intermediate nodes and/or the root node of the ART, may encode one key-value pair in which the key is the ART root hash of an ART associated with a current block in a fork and the value is the block height of the current block in the fork (e.g., a number of ancestor blocks of the current block in the fork). Another leaf node, alone or together with zero or more intermediate nodes and/or the root node of the ART, may encode another key-value pair in which the key is the block height of the current block in the fork and the value is the ART root hash of the ART associated the current block in the fork. The two key-value pairs may have alternating keys and values because a given block height could resolve to different blocks in different forks in the blockchain. By including both mappings (e.g., ART root hash to block height and block height to ART root hash) in two key-value pairs, a peer 102, a miner 104, and/or client 106 can identify the ART root hash and/or block height for a block in the correct fork (thereby ensuring that a provided proof, which is described below, includes the correct information).

In this way, given a MARF tip (e.g., a chain tip), a peer 102, a miner 104, and/or a client 106 can query the ART root hash and/or block height of any ancestor block in the fork of the MARF tip in O(1) time (instead of O(F) time, where F is the number of distinct forks of the blockchain) and O(1) space per block (instead of O(log² B)). Thus, by encoding one or more key-value pairs in the ART of a current block in a fork, a peer 102, a miner 104, and/or a client 106 can identify the ART root hash and/or block height of a block (e.g., for the purposes of generating a proof, as described in greater detail below) without having to walk backwards from a current block, repeatedly using the block header of a previous block to step back through the history of the fork to identify this information. Rather, the peer 102, miner 104, and/or client 106 can simply query the ART of the appropriate block to obtain the ART root hash and/or the block height of the respective block.

Overview of Merklized Skip-List

Another data structure in a MARF is a Merklized skip-list encoded from the ART root hashes (and/or block header hashes) of one or more blocks in a fork. For example, a peer 102, a miner 104, and/or a client 106 can determine the hash of the root node of the ART for block N (e.g., the ART root hash for block N) not only from the hash of the children of the root node, but also from the ART root hashes of the blocks N–1, N-2, N-4, N-8, N-16, and so on until the genesis of the fork is reached. The hash of the root node of the ART for block N and the ART root hashes from the previous blocks in the fork constitutes a Merklized skip-list over the sequence of ARTs.

By encoding the ART root hash in this way, it may be possible for a peer 102 to create and provide to a miner 104 or a client 106 a cryptographic proof that a particular key maps to a particular value when the value lives in a prior block and can only be accessed by following one or more back-pointers. In addition, the Merklized skip-list affords a miner 104 and/or a client 106 one or more ways to verify key-value pairs. For example, a miner 104 and/or client 106 can verify a key-value pair by obtaining a known-good ART root hash or by obtaining the sequence of block headers for the blockchain and the underlying burn chain of the blockchain (given that the ART root hash can be calculated from the sequence of block headers). However, verifying key-value pairs from the sequence of block headers can be computationally expensive for a miner 104 or a client 106 that is otherwise performing a small number of queries on a peer 102.

In some embodiments, a peer 102, a miner 104, and/or a client 104 can use SHA512/256 (e.g., a SHA512 hash truncated to 256 bits that uses the NIST SHA512/256-specific initialization vector) as the hash function used to generate a path from a key of a key-value pair, a value hash from a value of a key-value pair, and/or a hash of a node in an ART. Using SHA-256 and/or SHA-512 may result in faster hash operations being performed by a peer 102, a miner 104, and/or a client 106 and/or may allow the resulting hashes be immune from length extension attacks.

In some embodiments, the hash of an intermediate node can be the hash over the following data: (1) a 1-byte node ID, (2) the sequence of child pointer data (dependent on the type of node, such as whether the node is a leaf node and/or whether the node is present in another ART), (3) the 1-byte length of the path prefix included in this node, and/or (4) the 0-to-32-byte path prefix.

Overview of MARF Merkle Proofs

As described above, blocks in a blockchain store various transactions. A transaction may include a value for a particular key, such as a new value for a new key, an updated value for an existing key, and/or the like. As an illustrative example, a key may be an account number, and the corresponding value for the key may be the balance of the account. Thus, key-value pairs may store sensitive and/or confidential information, so it may be important to be able to verify that the value stored for a particular key is accurate and that a malicious actor has not altered such data.

Generally, a peer 102 (or a miner 104) can maintain an ART for a fork in a blockchain that encodes the transactions stored in blocks of the fork and that allows the peer to lookup values for various keys. As an example, a peer 102, a miner 104, and/or a client 106 can query another peer 102 for the value of a key stored in the blockchain fork. In response to receiving the query, the peer 102 can traverse the ART of a current block in the fork (e.g., the chain tip or any other block in the fork) to find the value that corresponds to the key included in the query. In particular, the peer 102 can generate a hash of the key included in the query to determine a path. The peer 102 can traverse the ART of the current block (or any other block in the fork) along the determined path, which may result in the peer 102 traversing to nodes in ARTs of previous blocks in the fork if back-pointers are encountered. Once the peer 102 reaches a leaf node that corresponds to a last portion of the determined path, the peer 102 can obtain the value hash stored by the leaf node and return the value hash to the querying entity. The entity that queried the peer 102, however, may not initially know whether to trust that the peer 102 returned an accurate value hash or returned a maliciously altered or otherwise incorrect value hash. Accordingly, the querying entity can request that the peer 102 provide a proof (or a set of proofs) that the querying entity can then use to verify that the returned value hash is indeed accurate.

For example, in response to receiving a query from another peer 102, a miner 104, and/or a client 106 to provide a proof that a returned value hash is accurate, a peer 102 can construct and return to the other peer 102, miner 104, and/or client 106 a MARF Merkle proof. The peer 102 can construct the MARF Merkle proof using one or more segment proofs and/or one or more shunt proofs. A segment proof may be a proof that a node belongs to a particular Merklized ART. In some embodiments, the segment proof is a Merkle tree proof. A shunt proof may be a proof that the ART for block N is exactly K blocks away from the ART at block N-K. The peer 102 may generate the shunt proof using the Merklized skip-list.

Figure 6A:
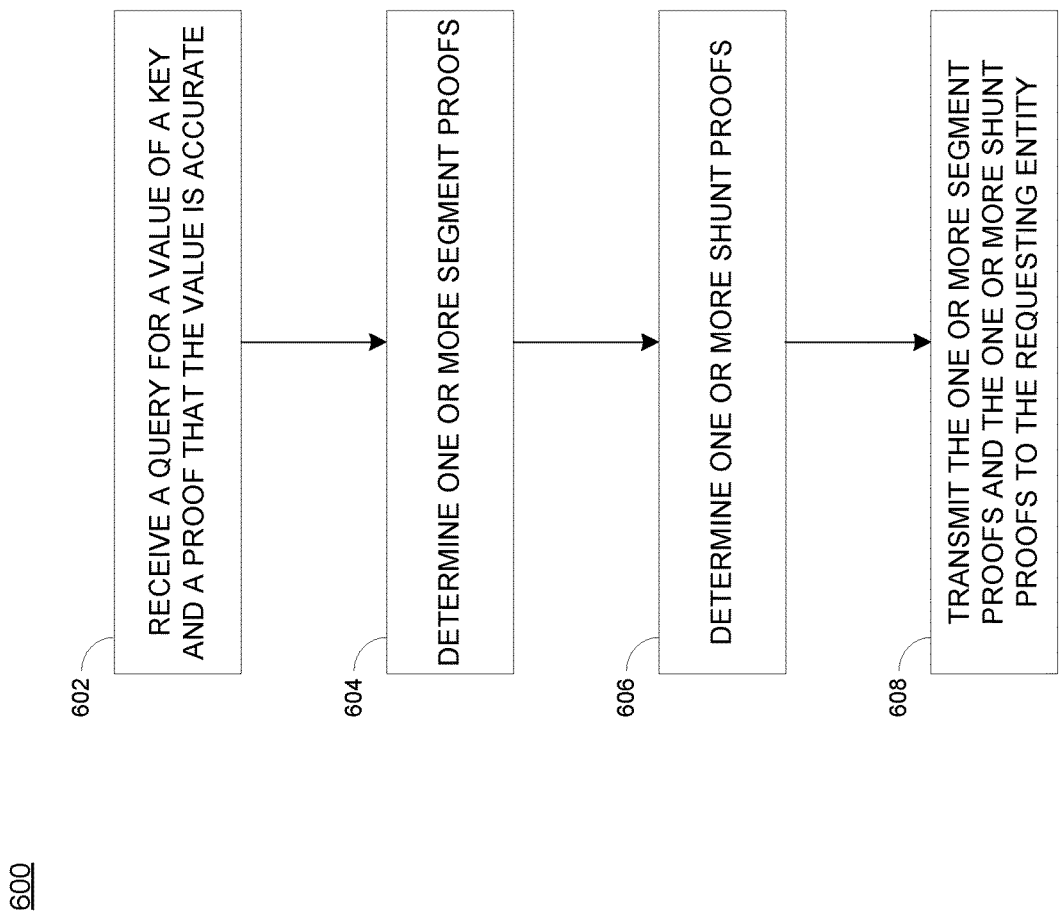
FIG. 6A is a flow chart that illustrates how a peer can construct a MARF Merkle proof in response to a request from another peer, a miner, and/or a client.

FIG. 6A is a flow chart 600 that illustrates how a peer 102 can construct a MARF Merkle proof in response to a request from another peer 102, a miner 104, and/or a client 106. A peer 102 can execute one or more computer-executable operations to implement the flow chart 600.

At block 602, a query is received for a value of a particular key and a MARF Merkle proof that the returned value is accurate. In particular, the requested MARF Merkle proof, if valid, may show that the returned value must have been included in the calculation of the ART root hash of the current block in the fork (e.g., which is the digest of the materialized view of the fork). The query can be received from a client 106. The query can also be received from another peer 102 or a miner 104.

At block 604, one or more segment proofs are calculated for a sequence of path prefixes. Each segment proof may be directed to two or more nodes in the same ART. For example, the peer 102 can hash the key included in the query to determine a path in the ART of the current block of the fork (e.g., the block in the fork with the highest block height, another block in the fork, etc.) and/or in ART(s) of other block(s) in the fork to traverse to identify the value to return. The peer 102 can begin to traverse the ART of the current block starting at the root node of the ART of the current block. Each time the peer 102 encounters a back-pointer, the peer 102 can generate a segment proof for the currently-visited ART and for nodes in the currently-visited ART up until the intermediate node that has a child that is the back-pointer that was encountered. When the peer 102 encounters the leaf node corresponding to the last portion of the determined path and that stores the value hash to return, the peer 102 can generate a segment proof for the ART that includes the leaf node. Thus, if the determined path includes i back-pointers, then the peer 102 may generate i+1 segment proofs.

As an illustrative example, and with reference to the ARTs 400 and 450 illustrated in FIG. 4A, if a client 106 (or another peer 102 or miner 104) submits a query for a value of a key and the hash of the key is "aabbccddeeff99887766" (e.g., the path corresponding to the leaf node 424 in the ART 450), then the peer 102 may start traversing at the root node 402 of the ART 400. After traversing to the intermediate node 404, the peer 102 may encounter the back-pointer 414. In response, the peer 102 may generate a segment proof for the ART 400 and for nodes up until the intermediate node 404. The segment proof for the ART 400 may include hashes of nodes that do not fall along the traversed path (which may include nodes that are sibling nodes of the intermediate node 404 and/or other intermediate nodes being traversed). For example, the segment proof for the ART 400 may include the hashes of all children of the root node 402 other than the hash of the intermediate node 404 (e.g., sibling nodes of the intermediate node 404) (given that the intermediate node 404 is traversed when following the path) and/or the hashes of all children of the intermediate node 404 other than the root hash of the ART 450 (which represents the hash of the leaf node 424 referenced by the back-pointer 414).

After traversing the back-pointer 414, the peer 102 encounters the leaf node 424 at the end of the determined path. In response, the peer 102 may generate a segment proof for the ART 450. The segment proof for the ART 450 may include hashes of nodes that do not fall along the traversed path or that are parent nodes of nodes that do fall along the traversed path. For example, the segment proof for the ART 450 may include the hashes of all children of the root node 420 other than the hash of the intermediate node 422 (given that the intermediate node 422 is a parent node of a node that is traversed when following the path) and/or the hashes of all children of the intermediate node 422 other than the hash of the leaf node 424 (given that the leaf node 424 is traversed when following the path). Thus, the peer 102 encounters one back-pointer during this traversal and generates two segment proofs as a result.

Before, during, and/or after the peer 102 has calculated some or all of the segment proofs, one or more shunt proofs are calculated at block 606. For example, the peer 102 can generate a shunt proof that shows that the i+1 segment (e.g., the portion of the path corresponding to the i+1 segment proof) was reached by walking back a given number of blocks in the fork from the i segment (e.g., the portion of the path corresponding to the i segment proof). Similarly, the peer 102 can generate another shunt proof that shows that the i segment (e.g., the portion of the path corresponding to the i segment proof) was reached by walking back a given number of blocks in the fork from the i−1 segment (e.g., the portion of the path corresponding to the i−1 segment proof). The peer 102 can continue to generate shunt proofs in this manner until reaching the segment in the ART of the current block in the fork. Thus, the peer 102 can generate the same number of shunt proofs and segment proofs in some embodiments.

The shunt proof that shows that the i+1 segment was reached by walking back a given number of blocks in the fork from the i segment can be referred to herein as the "head shunt proof." The head shunt proof can include a sequence of ART root hashes for certain ancestor blocks of the block that includes the leaf node storing the value hash to return. For example, assuming that the block that includes the leaf node storing the value hash to return is block N, then the ancestor blocks may be blocks that are a power of two behind block N and that are part of the same fork as the block N. In other words, the head shunt proof may include a sequence of ART root hashes for all of the prior blocks that would be used to produce the ART root hash of the block N. As an illustrative example, the ancestor blocks may be blocks N−1, N−2, N−4, N−8, N−16, and so on until the genesis of the fork is reached. Thus, if the hash of the children of the root node of block N is known, then a client 106 (or another peer 102 or miner 104) can use this information along with the ART root hashes of the ancestor blocks indicated above to determine the ART root hash of the block N (e.g., the ART root hash of the block N is the hash of (1) the hash of the children of the root node of the block N; (2) the ART root hash of N−1; (3) the ART root hash of N−2; (4) the ART root hash of N−4; and so on until all ART root hashes of ancestor blocks that are a power of two behind the block N and that are part of the same fork as block N are included as elements in the hash).

Any subsequent shunt proofs may include the ART root hashes that are used to calculate the hashes on the skip-list from the ART root hash of the next segment proof. For example, if the i segment is found in the block N−5 and the i−1 segment is found in the block N, then the shunt proof for these segments is the ART root hashes that are used to walk back from block N to block N−5 other than the ART root hashes for N−5 and any block that is traversed to reach block N−5. In particular, the block N−5 is not a power of two behind block N. Thus, a peer 102, a miner 104, or a client 106 may initially walk back from N to N−4 (which is a power of two behind block N). Next, the peer 102, miner 104, or client 106 may walk back from N−4 to N−5 (where N−5 is 1 behind N−4, and therefore is a power of two behind N−4). In this example, the shunt proof may therefore include the ART root hashes for blocks N−1, N−2, N−8, N−16, and so on until the genesis of the fork is reached (which are used to determine the ART root hash for block N) and the ART root hashes for blocks N−6, N−8, N−12, N−20, and so on until the genesis of the fork is reached (which are used to determine the ART root hash for block N−4). Note that N−4 is also used to determine the ART root hash for block N, but may not be included in the shunt proof because this is a value that would be determined by the verifying entity. Similarly, N−5 may be used to determine the ART root hash for block N−4, but may not be included in the shunt proof because this is a value that would be determined by the verifying entity. Thus, the shunt proof may include multiple sequences of ART root hashes, such that the hash of the next ART root node can be calculated from the previous sequence.

As an illustrative example, and with reference to the ARTs 400 and 450 illustrated in FIG. 4A, the leaf node 424 is the node that stores the value hash to return in response to a query. Thus, the peer 102 may generate a head shunt proof for the last segment of the determined path (e.g., the segment falling in the ART 450) that includes the ART root hashes of blocks N−11, N−12, N−14, N−18, N−26 and so on until the genesis of the fork is reached, which in combination with the hash of the children of the root node of the ART 450, can be used to determine the ART root hash of the block N−10. In some embodiments, the head shunt proof includes the hash of the children of the root node of the ART 450. In other embodiments, the head shunt proof does not include the hash of the children of the root node of the ART 450. Rather, the hash of the children of the root node of the ART 450 can be derived by a client 106 (or another peer 102 or miner 104) using the second segment proof and the returned value hash.

The peer 102 may also generate a second shunt proof for the first segment of the determined path (e.g., the segment falling in the ART 400) that includes (1) the ART root hashes of blocks N−1, N−2, N−4, N−16, and so on for all other blocks that are a power of two behind block N until the genesis of the fork is reached; and (2) the ART root hashes of blocks N−9, N−12, N−16, N−24, and so on for all other blocks that are a power of two behind block N−8 until the genesis of the fork is reached. The second shunt proof may include these two sequences of ART root hashes because to walk from block N to block N−10, the peer 102 may have to walk from block N to block N−8, and then from block N−8 to block N−10. Because block N−8 would be traversed and block N−10 includes the leaf node that stores the value hash to return, the second shunt proof may not include the ART root hashes for N−8 or N−10 given that the client 106 (or another peer 102 or miner 104) may determines these ART root hashes when verifying whether the returned data is accurate.

At block 608, the one or more segment proofs and the one or more shunt proofs are transmitted to the requesting entity (e.g., the client 106, another peer 102, a miner 104, etc.). The peer 102 can also return the value hash stored in the leaf node reached upon traversing the determined path to the requesting entity. Upon receiving the segment proof(s) and the shunt proof(s), the requesting entity can use the proof(s) to verify the accuracy of the returned value hash. For example, the requesting entity can use the head shunt proof and the last segment proof to determine the ART root hash of the block that includes the leaf node storing the returned value hash. The requesting entity can then use the determined ART root hash of the block that includes the leaf node storing the returned value hash, the next shunt proof corresponding to the ART that includes a back-pointer to the block that includes the leaf node, and the second-to-last segment proof to determine the ART root hash of the block that includes the back-pointer. The requesting entity can continue this process until the requesting entity determines the ART root hash of the current block in the fork. The requesting entity may separately have access to the ART root hash of the current block in the fork (e.g., the peer 102 may have provided the ART root hash of the current block in the fork a priori, when providing the value hash, upon request from the requesting entity, etc.). Thus, the requesting entity can compare the determined ART root hash of the current block in the fork with the provided ART root hash of the current block in the fork. If the two ART root hashes match, then the requesting entity may be able to verify that the returned value hash is accurate (e.g., the ART root hash of the current block in the fork is an accurate digest of the materialized view of this fork).

As an illustrative example, and with reference to the ARTs 400 and 450 illustrated in FIG. 4A, the second segment proof the returned value hash may allow a client 106 (or another peer 102 or miner 104) to determine the hash of the children of the root node 420 of the ART 450. For example, the client 106 (or another peer 102 or miner 104) can hash the value hash and any other children of the intermediate node 422 (as provided by the second segment proof) to determine the hash of the intermediate node 422. The client 106 (or another peer 102 or miner 104) can then hash the hash of the intermediate node 422 and any other children of the root node 420 (as provided by the second segment proof) to determine the hash of the children of the root node 420. The client 106 (or another peer 102 or miner 104) can use the hash of the children of the root node 420 and the head shunt proof to then determine the ART root hash of the block N−10. Specifically, the client 106 (or another peer 102 or miner 104) can hash (1) the hash of the children of the root node 420; (2) the ART root hash of block N−11 (as provided by the head shunt proof); (3) the ART root hash of block N−12 (as provided by the head shunt proof); (4) the ART root hash of block N−14 (as provided by the head shunt proof); and so on until all ART root hashes of blocks that are a power of two behind block N−10 and that are part of the same fork as block N−10 are included as elements to be hashed to determine the ART root hash of block N−10.

Once the ART root hash of block N−10 is determined, the client 106 (or another peer 102 or miner 104) can determine the ART root hash of block N−8. For example, the client 106 (or another peer 102 or miner 104) can request (e.g., from a peer 102) a hash of the children of the root node of block N−8. The client 106 (or another peer 102 or miner 104) can then take a hash of (1) the hash of the children of the root node of block N−8; (2) the ART root hash of block N−9 (as provided by the second shunt proof); (3) the ART root hash of block N−10 (as determined previously by the client 106); (4) the ART root hash of block N−12 (as provided by the second shunt proof); (5) the ART root hash of block N−16 (as provided by the second shunt proof); and so on until all ART root hashes of blocks that are a power of two behind block N–8 and that are part of the same fork as block N–8 are included as elements to be hashed to determine the ART root hash of block N–8.

Once the ART root hash of block N–8 is determined, the client 106 (or another peer 102 or miner 104) can determine the ART root hash of block N. For example, the client 106 (or another peer 102 or miner 104) can use the first segment proof to determine the hash of the children of the root node 402. In particular, the client 106 (or another peer 102 or miner 104) can take a hash of (1) the value hash of the leaf node 406 (as provided in the first segment proof); (2) the value hash of the leaf node 408 (as provided in the first segment proof); (3) the value hash of the leaf node 410 (as provided in the first segment proof); (4) the value hash of the leaf node 412 (as provided in the first segment proof); and (5) the ART root hash of the block N–10 (as determined previously) to determine the hash of the intermediate node 404. The client 106 (or another peer 102 or miner 104) can then take the hash of the hash of the intermediate node 404 and of any other children of the root node 402 to determine the hash of the children of the root node 402. Once the hash of the children of the root node 402 is determined, the client 106 (or another peer 102 or miner 104) can determine the ART root hash of block N by taking a hash of (1) the hash of the children of the root node 402 (as previously determined); (2) the ART root hash of the block N–1 (as provided in the second shunt proof); (3) the ART root hash of the block N–2 (as provided in the second shunt proof); (4) the ART root hash of the block N–4 (as provided in the second shunt proof); (5) the ART root hash of the block N–8 (as previously determined); and so on until all ART root hashes of blocks that are a power of two behind block N and that are part of the same fork as block N are included as elements to be hashed.

The ART root hash of the block N may otherwise be known to the client 106 (or another peer 102 or miner 104) based on a previous query or the peer 102 supplying this information when the query was submitted. Thus, the client 106 (or another peer 102 or miner 104) can compare the determined ART root hash of the block N to the provided ART root hash of the block N. If the ART root hashes match, then the client 106 (or another peer 102 or miner 104) can confirm that the returned value hash is the actual value hash stored in block N–10.

Figure 6B:
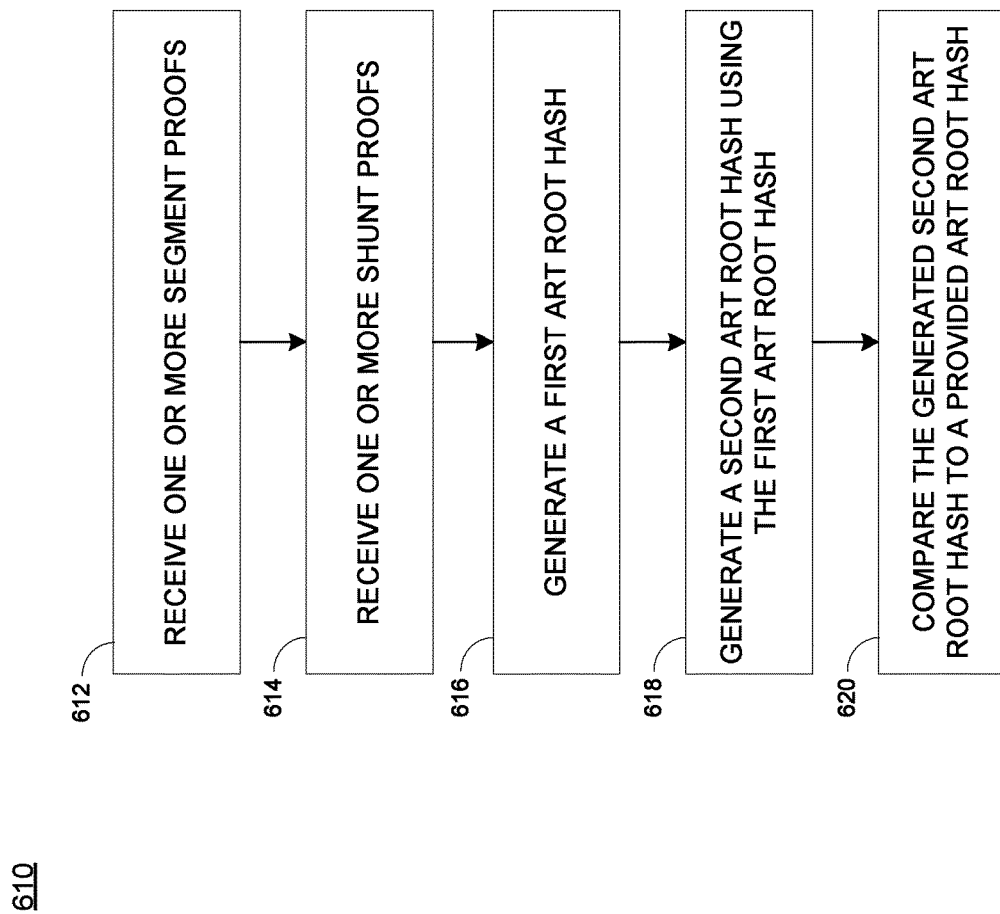
FIG. 6B is a flow chart that illustrates how a client (or a peer or miner) can fully verify a value hash returned by a peer using a MARF Merkle proof.

FIG. 6B is a flow chart 610 that illustrates how a client 106 (or a peer 102 or miner 104) can fully verify a value hash returned by a peer 102 using a MARF Merkle proof. A client 106 can execute one or more computer-executable operations to implement the flow chart 610.

At block 612, one or more segment proofs are received from a peer 102. The number of segment proofs that are received may be dependent on the number of back-pointers that are encountered when the peer 102 traversed to the leaf node that stored the returned value hash. The segment proof(s) may be received in response to querying a peer 102 using a key and requesting a proof that the returned value hash is accurate.

At block 614, one or more shunt proofs are received from a peer 102. The number of shunt proofs that are received may be dependent on the number segment proofs that are generated (e.g., the number of back-pointers that are encountered when the peer 102 traversed to the leaf node that stored the returned value hash). The shunt proof(s) may be received in response to querying a peer 102 using a key and requesting a proof that the returned value hash is accurate.

At block 616, a first ART root hash is generated using one of the received segment proofs and one of the received shunt proofs. For example, the first ART root hash may be generated for the block associated with the ART that includes the leaf node that stores the returned value hash.

At block 618, a second ART root hash is generated using another one of the received segment proofs, another one of the received shunt proofs, and the first ART root hash. For example, the second ART root hash may be generated for the current block in the fork.

At block 620, the generated second ART root hash is compared to a provided ART root hash. For example, the ART root hash of the current block in the fork may have been previously provided to the client 106. The client 106 can then compare the previously-provided ART root hash of the current block with the ART root hash of the current block determined by the client 106 to verify whether the ART of the current block is an accurate digest of the materialized view of the fork (e.g., whether the returned value hash is accurate or inaccurate).

In further embodiments, the client 106 can use the segment proof(s) and/or the shunt proof(s) optionally (1) to verify that the first segment proof's path's bytes are equal to the hash of the key for which the proof was requested; (2) to verify that the first segment proof ends in a leaf node, and that the leaf node contains the hash of the value for which the proof was requested; (3) to verify that each segment proof is valid by checking that the root hash can only be calculated from the deepest intermediate node in the segment; (4) to verify that each subsequent segment proof was generated from a prefix of the path represented by the current segment proof; (5) to verify that each back-pointer at the tail of each segment (except the one that terminates in the leaf (e.g., the first one)) was a number of blocks back that is equal to the number of blocks skipped over in the shunt proof linking it to the next segment; (6) to verify that each block header was included in the fork the client is querying, and that each block header was generated from its associated ART root hash; and/or (7) to verify that the burn chain block headers demonstrate that the correct difficulty rules were followed (although this may be skipped if the client 106 somehow already knows that the hash of block N is valid).

In some embodiments, to verify the MARF Merkle proof, the client 106 may substitute the block header hash (e.g., ART root hash) for each intermediate node at the tail of each segment proof. The client 106 can obtain the block header hash by fetching the block headers for both the blockchain and the underlying blockchain (e.g., in proof-of-transfer or proof-of-burn implementations) a priori and verifying that the block headers are valid, or by fetching the block headers on-the-fly.

The security of the MARF Merkle proof is similar to traditional Simplified Payment Verification (SPV) proofs. For example, the proof may be valid assuming that the client 106 (or another peer 102 or miner 104) is able to either: (1) verify that the final header hash represents the true state of the network; or (2) fetch the true burn chain block header sequence. The client 106 may have some assurance that a given header sequence is the true header sequence, because the header sequence encodes the proof-of-work that went into producing the header sequence. A header sequence with a large amount of proof-of-work can be assumed to be infeasible for an attacker to produce (e.g., only the majority of the burn chain's network hash power could have produced the header chain). Regardless of which data the client 106 has, the usual security assumptions about confirmation depth may apply-a proof that a key maps to a given value may be valid if the transaction that set the mapping is unlikely to be reversed by a chain reorganization.

Figure 6C:
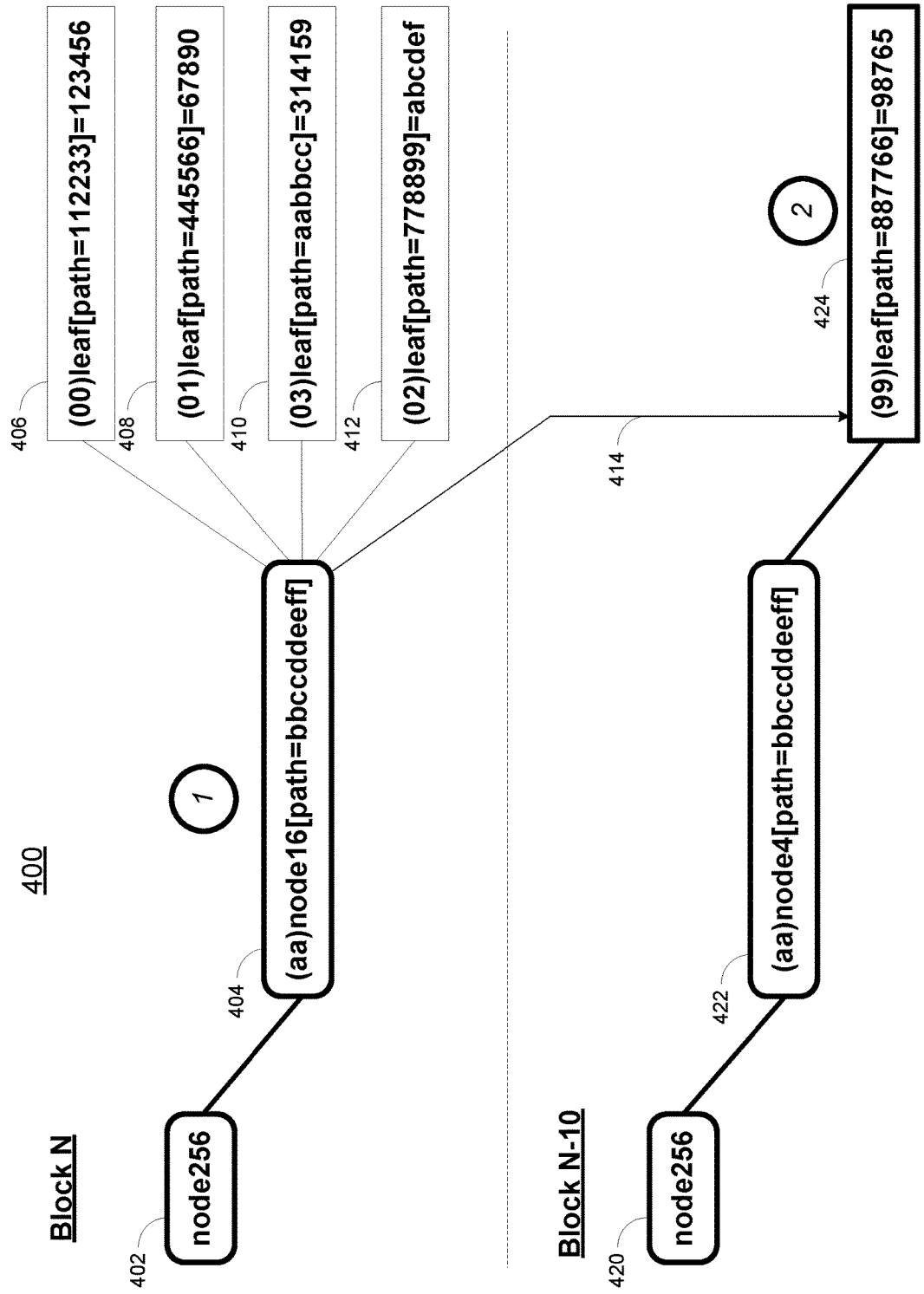
FIG. 6C illustrates an example construction of a MARF Merkle proof.

An example construction of a MARF Merkle proof is shown in FIG. 6C. FIG. 6C illustrates the same ARTs 400 and 450 shown in FIG. 4A: an ART 450 for block N-10 and an ART 400 for block N. The ART 400 has a back-pointer to the leaf node 424 in the ART 450 of block N-10. In order to generate a MARF Merkle proof, the client 106 queries a peer 102 for a particular value hash, and then requests that the peer 102 generate a proof that the key and value must have been included in the calculation of the ART root hash of the current block (e.g., block N) (e.g., the digest of the materialized view of this fork).

For instance, given the key-value pair of "aabbccdde-eff99887766=98765" (associated with leaf node 424) and the hash of the ART 400 at block N, the peer 102 can generate two segment proofs for the following paths: "aabbccddeeff" in block N and "aabbccddeeff99887766" in block N-10. The paths of these two segment proofs are represented by circle 1 and circle 2 in FIG. 6C, respectively.

The segment proof for the "aabbccddeeff" path in block N (circle 1) may include all the hashes of all other children of the root node 402, except for the one at child slot 0xaa. The segment proof for the "bbccddeeff" path in block N-10 (circle 2) may include two sequences of hashes: the hashes for all children of the root node 420 besides the child at child slot 0xaa, and also the hashes for all children of the intermediate node 422 except the child at child slot 0x99.

Then, the peer 102 can calculate two shunt proofs. The first shunt proof (e.g., the head shunt proof) can supply the sequence of block hashes for blocks N-11, N-12, N-14, N-18, N-26, and so on until the genesis of the fork is reached and the hash of the children of the root node 420 of the ART 450. The first shunt proof may allow the client 106 to calculate the ART root hash of block N-10.

The second shunt proof (and all subsequent shunt proofs, if there are more back-pointers to follow) can include the hashes that are used to calculate the hashes on the skip-list from the next segment proofs root hash. In this case, the second shunt proof can include two parts. The first part can include the block header hashes for blocks N-9, N-12, N-16, N-24, and so forth. The second part can include the block header hashes for blocks N-1, N-2, N-4, N-16, N-32, and so forth. The reason there are two sequences in the second shunt proof may be because walking back from block N to block N-10 may involve walking first to block N-8 (e.g., following the skip-list column for 2  3), and then walking to block N-10 from N-8 (e.g., following its skip-list column for 2  1). The first segment proof (e.g., with the leaf) may allow the client 106 to calculate the hash of the children of the root node 420 of block N-10, which when combined with the first part of the second shunt proof may yield the ART root hash for block N-8. Then, the client 106 can use the hash of the children of the root node 402 in the ART 400 of block N (calculated from the second segment proof), combined with the ART root hash of block N-8 and the hashes in the second part of the second shunt proof, to calculate the ART root hash for block N. The proof may be valid if this calculated root hash matches the root hash for which the client 106 requested the proof.

MARF Implementation Details

The time and space complexity of a MARF is as follows. Reads are O(F), where F is the number of distinct forks of the blockchain. F is expected to be O(1) when working on the longest fork of the blockchain, so reads on the longest fork are effectively O(1). Inserts and updates are O(F). This is because keys are fixed-length, and the worst that can happen is an insert of a fixed number of fixed-length segments, and verifying a fixed number of $O(\log^2 B)$ shunt or update is that a copy-on-write can follow F forks. Because F is O(1) in expectation, inserts and updates are also O(1) in expectation. Creating a new fork in the blockchain is O(1). This is simply the cost of adding one row to the fork table and adding one entry to the ancestor table. Generating a proof may be $O(\log^2 B)$ for B blocks (instead of, for example, $O(F \log^2 B)$) given that an ART may encode the fork table 504 and/or the ancestor table 506 as described above. This is the cost of reading a fixed number of nodes, combined with walking the Merkle skip-list. Verifying a proof is $O(\log^2 B)$. This is the cost of verifying proof hashes. Proof size is $O(\log^2 B)$. A proof has a fixed number of segment proofs, where each node has a constant size, and has $O(\log^2 B)$ hashes across all of its shunt proofs.

Example Hardware Configuration of Computing System

Figure 7:
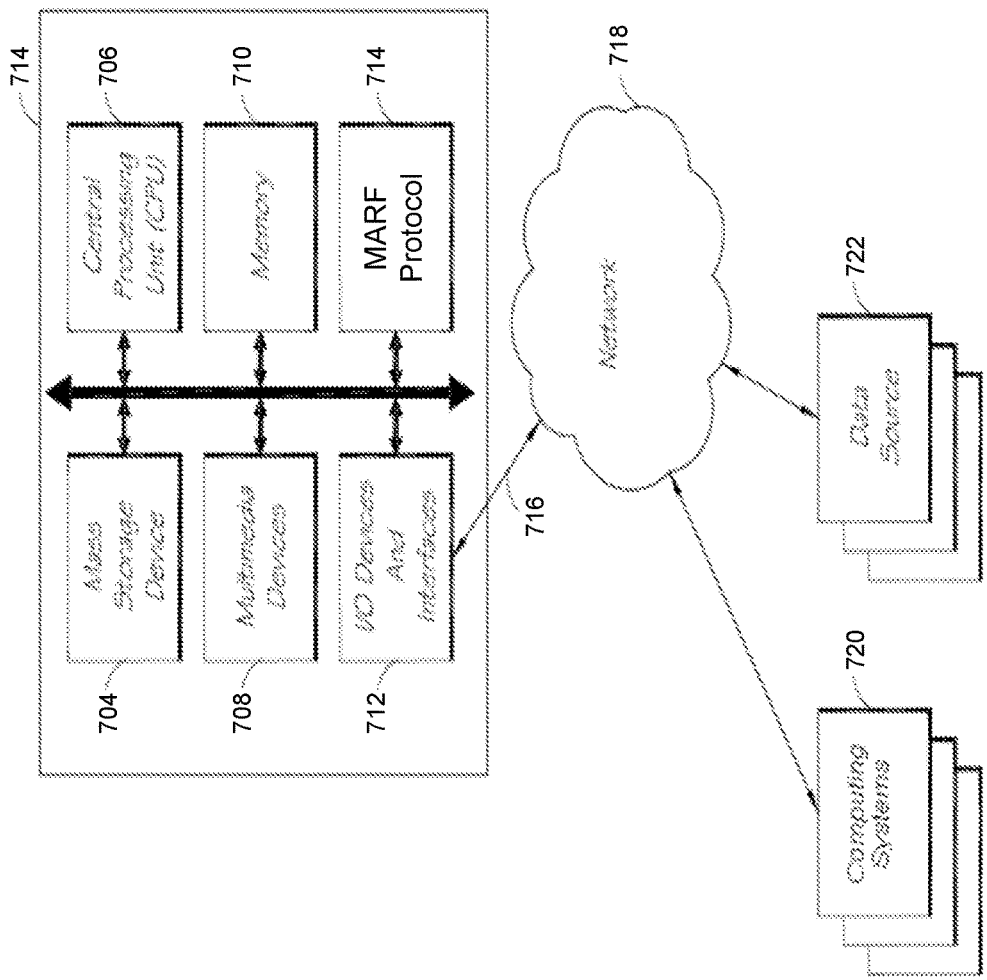
FIG. 7 illustrates an embodiment of a hardware configuration for a computing system that can be used to implement the systems, processes, and methods described herein.

FIG. 7 illustrates an embodiment of a hardware configuration for a computing system that can be used to implement the systems, processes, and methods described herein. For example, the illustrated embodiment of the computer system can be used for the property valuation system described herein.

For instance, the example computer system 702 is in communication with one or more computing systems 720 and/or one or more data sources 722 via one or more networks 718. While FIG. 7 illustrates an embodiment of a computing system 702, it is recognized that the functionality provided for in the components and modules of computer system 702 may be combined into fewer components and modules, or further separated into additional components and modules.

The computer system 702 can comprise a MARF protocol module 714 that carries out the functions, methods, acts, and/or processes described herein. The MARF protocol module 714 is executed on the computer system 702 by a central processing unit 706 discussed further below.

In general the word "module," as used herein, refers to logic embodied in hardware or firmware or to a collection of software instructions, having entry and exit points. Modules are written in a program language, such as JAVA, C or C++, PYTHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 702 includes one or more processing units (CPU) 706, which may comprise a microprocessor. The computer system 702 further includes a physical memory 710, such as random access memory (RAM) for temporary storage of information, a read only memory (ROM) for permanent storage of information, and a mass storage device 704, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 702 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 702 includes one or more input/output (I/O) devices and interfaces 712, such as a keyboard, mouse, touch pad, and printer. The I/O devices and interfaces 712 can include one or more display devices, such as a monitor, that allows the visual presentation of data to a participant. More particularly, a display device provides for the presentation of GUIs as application software data, and multi-media presentations, for example. The I/O devices and interfaces 712 can also provide a communications interface to various external devices. The computer system 702 may comprise one or more multi-media devices 708, such as speakers, video cards, graphics accelerators, and microphones, for example.

The computer system 702 may run on a variety of computing devices, such as a server, a Windows server, a Structure Query Language server, a Unix Server, a personal computer, a laptop computer, and so forth. In other embodiments, the computer system 702 may run on a cluster computer system, a mainframe computer system and/or other computing system suitable for controlling and/or communicating with large databases, performing high volume transaction processing, and generating reports from large databases. The computing system 702 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 702 illustrated in FIG. 7 is coupled to a network 718, such as a LAN, WAN, or the Internet via a communication link 716 (wired, wireless, or a combination thereof). Network 718 communicates with various computing devices and/or other electronic devices. Network 718 is communicating with one or more computing systems 720 and one or more data sources 722. The MARF protocol module 714 may access or may be accessed by computing systems 720 and/or data sources 722 through a web-enabled user access point. Connections may be a direct physical connection, a virtual connection, and other connection type. The web-enabled user access point may comprise a browser module that uses text, graphics, audio, video, and other media to present data and to allow interaction with data via the network 718.

Access to the MARF protocol module 714 of the computer system 702 by computing systems 720 and/or by data sources 722 may be through a web-enabled user access point such as the computing systems 720 or data source's 722 personal computer, cellular phone, smartphone, laptop, tablet computer, e-reader device, audio player, or other device capable of connecting to the network 718. Such a device may have a browser module that is implemented as a module that uses text, graphics, audio, video, and other media to present data and to allow interaction with data via the network 718.

The output module may be implemented as a combination of an all-points addressable display such as a cathode ray tube (CRT), a liquid crystal display (LCD), a plasma display, or other types and/or combinations of displays. The output module may be implemented to communicate with input devices 712 and they also include software with the appropriate interfaces which allow a user to access data through the use of stylized screen elements, such as menus, windows, dialogue boxes, toolbars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the computing system 702 may comprise a physical or logical connection established between a remote microprocessor and a mainframe host computer for the express purpose of uploading, downloading, or viewing interactive data and databases on-line in real time. The remote microprocessor may be operated by an entity operating the computer system 702, including the client server systems or the main server system, and/or may be operated by one or more of the data sources 722 and/or one or more of the computing systems 720. In some embodiments, terminal emulation software may be used on the microprocessor for participating in the micro-mainframe link.

In some embodiments, computing systems 720 which are internal to an entity operating the computer system 702 may access the MARF protocol module 714 internally as an application or process run by the CPU 706.

The computing system 702 may include one or more internal and/or external data sources (for example, data sources 722). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 702 may also access one or more databases 722. The databases 722 may be stored in a database or data repository. The computer system 702 may access the one or more databases 722 through a network 718 or may directly access the database or data repository through I/O devices and interfaces 712. The data repository storing the one or more databases 722 may reside within the computer system 702.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computing device of a decentralized network comprising:
    a network interface configured to couple the computing device to the decentralized network;
    a hardware processor; and
    a non-transitory computer readable storage medium storing program instructions for execution by the hardware processor in order to cause the computing device to:
        transmit a request for a value associated with a key, wherein a hash of the value is stored in a first adaptive radix trie (ART) associated with a first block in a fork in a blockchain, and wherein the first block is an ancestor of a current block in the fork in the blockchain;
        transmit a second request for a proof that the hash of the value received in response to transmission of the request is valid;
        determine an ART root hash of the first block using a head shunt proof and a first segment proof received in response to transmission of the second request, wherein the head shunt proof is based on a hash of data derived from a second ART different than the first ART that is associated with a second block in the fork in the blockchain that precedes the first block, wherein the second block is another ancestor of the current block in the fork in the blockchain;
        determine a second ART root hash of the current block using a second shunt proof received in response to transmission of the second request, a second segment proof received in response to transmission of the second request, and the determined ART root hash of the first block;
        compare the determined second ART root hash of the current block to a third ART root hash provided by a second computing device; and
        validate that a third ART associated with the current block represents an accurate digest of a materialized view of the fork in response to a determination that the determined second ART root hash matches the third ART root hash.

2. The computing device of claim 1, wherein the third ART root hash is an ART root hash of the current block as indicated by the second computing device.

3. The computing device of claim 1, wherein the third ART associated with the current block comprises a back-pointer to the ART associated with the first block.

4. The computing device of claim 1, wherein the head shunt proof comprises an indication of an ART root hash of at least one ancestor of the first block.

5. The computing device of claim 4, wherein the first segment proof comprises an indication of a hash of at least one node in the ART associated with the first block.

6. The computing device of claim 5, wherein the program instructions, when executed, further cause the computing device to:
    generate a hash of the hash of the value and the hash of the at least one node in the ART associated with the first block to determine a hash of children of a root node of the ART associated with the first block; and
    generate a hash of the hash of the children of the root node of the ART associated with the first block and the ART root hash of the at least one ancestor of the first block to determine the ART root hash of the first block.

7. The computing device of claim 1, wherein the second shunt proof comprises an indication of an ART root hash of at least one ancestor of the current block.

8. The computing device of claim 7, wherein the second segment proof comprises an indication of a hash of at least one node in the third ART associated with the current block.

9. The computing device of claim 8, wherein the third ART associated with the current block comprises a back-pointer to the ART associated with the first block, and wherein the program instructions, when executed, further cause the computing device to:
    generate a hash of the ART root hash of the first block and the hash of the at least one node in the third ART associated with the current block to determine a hash of children of a root node of the third ART associated with the current block; and
    generate a hash of the hash of the children of the root node of the third ART associated with the current block and the ART root hash of the at least one ancestor of the current block to determine the second ART root hash of the current block.

10. The computing device of claim 1, wherein the program instructions, when executed, further cause the computing device to validate that the hash of the value is accurate in response to a determination that the determined second ART root hash matches the third ART root hash.

11. The computing device of claim 1, wherein the program instructions, when executed, further cause the computing device to determine that a peer computing device in the decentralized network that provided the hash of the value is a trusted entity in response to a determination that the determined second ART root hash matches the third ART root hash.

12. A computer-implemented method comprising:
    transmitting, by a computing device in a decentralized network, a request for a value associated with a key, wherein a hash of the value is stored in a first adaptive radix trie (ART) associated with a first block in a fork in a blockchain, and wherein the first block is an ancestor of a current block in the fork in the blockchain;
    transmitting a second request for a proof that the hash of the value received in response to transmission of the request is valid;
    determining an ART root hash of the first block using a head shunt proof and a first segment proof received in response to transmission of the second request, wherein the head shunt proof is based on a hash of data derived from a second ART different than the first ART that is associated with a second block in the fork in the blockchain that precedes the first block, wherein the second block is another ancestor of the current block in the fork in the blockchain;
    determining a second ART root hash of the current block using a second shunt proof received in response to transmission of the second request, a second segment proof received in response to transmission of the second request, and the determined ART root hash of the first block;
comparing the determined second ART root hash of the current block to a third ART root hash provided by a second computing device; and
validating that a third ART associated with the current block represents an accurate digest of a materialized view of the fork in response to a determination that the determined second ART root hash matches the third ART root hash.

13. The computer-implemented method of claim 12, wherein the third ART root hash is an ART root hash of the current block as indicated by the second computing device.

14. The computer-implemented method of claim 12, wherein the third ART associated with the current block comprises a back-pointer to the ART associated with the first block.

15. The computer-implemented method of claim 12, wherein the head shunt proof comprises an indication of an ART root hash of at least one ancestor of the first block.

16. The computer-implemented method of claim 15, wherein the first segment proof comprises an indication of a hash of at least one node in the ART associated with the first block.

17. The computer-implemented method of claim 16, wherein determining an ART root hash of the first block further comprises:
generating a hash of the hash of the value and the hash of the at least one node in the ART associated with the first block to determine a hash of children of a root node of the ART associated with the first block; and
generating a hash of the hash of the children of the root node of the ART associated with the first block and the ART root hash of the at least one ancestor of the first block to determine the ART root hash of the first block.

18. Non-transitory, computer-readable storage media comprising computer-executable instructions for validating data obtained from a blockchain, wherein the computer-executable instructions, when executed by a computer system in a decentralized network, cause the computer system to:
transmit a request for a value associated with a key, wherein a hash of the value is stored in a first adaptive radix trie (ART) associated with a first block in a fork in a blockchain, and wherein the first block is an ancestor of a current block in the fork in the blockchain;
transmit a second request for a proof that the hash of the value received in response to transmission of the request is valid;
determine an ART root hash of the first block using a head shunt proof and a first segment proof received in response to transmission of the second request, wherein the head shunt proof is based on a hash of data derived from a second ART different than the first ART that is associated with a second block in the fork in the blockchain that precedes the first block, wherein the second block is another ancestor of the current block in the fork in the blockchain;
determine a second ART root hash of the current block using a second shunt proof received in response to transmission of the second request, a second segment proof received in response to transmission of the second request, and the determined ART root hash of the first block;
compare the determined second ART root hash of the current block to a third ART root hash provided by a second computing device; and
validate that a third ART associated with the current block represents an accurate digest of a materialized view of the fork in response to a determination that the determined second ART root hash matches the third ART root hash.

19. The non-transitory, computer-readable storage media of claim 18, wherein the computer-executable instructions further cause the computer system to validate that the hash of the value is accurate in response to a determination that the determined second ART root hash matches the third ART root hash.

20. The non-transitory, computer-readable storage media of claim 18, wherein the computer-executable instructions further cause the computer system to determine that a peer computing device in the decentralized network that provided the hash of the value is a trusted entity in response to a determination that the determined second ART root hash matches the third ART root hash.

* * * * *